United States Patent
Ma et al.

(10) Patent No.: US 8,230,360 B2
(45) Date of Patent: Jul. 24, 2012

(54) USER INTERFACE FOR SELECTION FROM MEDIA COLLECTION

(75) Inventors: Jeffrey Ma, Redwood City, CA (US); Gregory Dudey, Los Gatos, CA (US); Rachel Clare Goldeen, Mountain View, CA (US); Justin Henzie, Concord, CA (US); Rainer Brodersen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 647 days.

(21) Appl. No.: 12/014,050

(22) Filed: Jan. 14, 2008

(65) Prior Publication Data
US 2009/0177989 A1 Jul. 9, 2009

Related U.S. Application Data

(60) Provisional application No. 61/019,192, filed on Jan. 4, 2008.

(51) Int. Cl.
*G06F 3/048* (2006.01)
(52) U.S. Cl. ......... 715/810; 715/788; 715/826; 715/835
(58) Field of Classification Search .......... 715/716–721, 715/730, 732, 229, 788, 810, 826
See application file for complete search history.

(56) References Cited

U.S. PATENT DOCUMENTS

| | | | |
|---|---|---|---|
| 5,283,864 A * | 2/1994 | Knowlton | ...................... 715/776 |
| 5,303,388 A | 4/1994 | Kreitman et al. | |
| 5,345,543 A | 9/1994 | Capps et al. | |
| 5,396,590 A | 3/1995 | Kreegar | |
| 5,452,414 A | 9/1995 | Rosendahl et al. | |
| 5,864,868 A | 1/1999 | Contois | |
| 6,006,227 A | 12/1999 | Freeman et al. | |
| 6,263,503 B1 * | 7/2001 | Margulis | ......................... 725/81 |
| 6,346,951 B1 | 2/2002 | Mastronardi | |
| 6,638,313 B1 | 10/2003 | Freeman et al. | |
| 6,725,427 B2 | 4/2004 | Freeman et al. | |
| 6,768,999 B2 | 7/2004 | Prager et al. | |

(Continued)

FOREIGN PATENT DOCUMENTS

EP 1677497 A1 7/2006
(Continued)

OTHER PUBLICATIONS

"CoverFlow", www.steelskies.com/coverflow/, downloaded Feb. 14, 2011.

(Continued)

*Primary Examiner* — TuyetLien Tran
*Assistant Examiner* — Amy M Levy
(74) *Attorney, Agent, or Firm* — Fish & Richardson P.C.

(57) ABSTRACT

Among other things, techniques and systems are disclosed for providing a graphical user interface (GUI) to user. A system includes a content source and a GUI communicatively connected to the content source. The GUI includes a user input area to receive user input and a display area to display available content items from the content source based on the received user input. The display area includes a presentation of the available content arranged in one or more rows. Each row includes a user selectable area to display at least one visual indication that represents one or more of the available content items. Each row includes a holding area to display another visual indication that represents other available content items not displayed in the user selectable area. The display area includes highlighting positioned over one of the available content items.

36 Claims, 32 Drawing Sheets

U.S. PATENT DOCUMENTS

| | | | |
|---|---|---|---|
| 7,055,104 B1* | 5/2006 | Billmaier et al. | 715/765 |
| 7,085,590 B2 | 8/2006 | Kennedy et al. | |
| 7,231,607 B2* | 6/2007 | Neely et al. | 715/747 |
| 7,343,414 B2 | 3/2008 | Lipscomb et al. | |
| 7,581,186 B2 | 8/2009 | Dowdy et al. | |
| 7,917,846 B2 | 3/2011 | Decker et al. | |
| 2001/0015719 A1 | 8/2001 | Van et al. | |
| 2002/0030699 A1 | 3/2002 | Van | |
| 2002/0067373 A1* | 6/2002 | Roe et al. | 345/762 |
| 2002/0067376 A1* | 6/2002 | Martin et al. | 345/810 |
| 2002/0080180 A1* | 6/2002 | Mander et al. | 345/769 |
| 2002/0113824 A1 | 8/2002 | Myers | |
| 2003/0020671 A1* | 1/2003 | Santoro et al. | 345/1.3 |
| 2004/0013416 A1 | 1/2004 | Mok | |
| 2004/0070593 A1* | 4/2004 | Neely et al. | 345/716 |
| 2004/0199582 A1 | 10/2004 | Kucharewski et al. | |
| 2005/0015355 A1 | 1/2005 | Heller et al. | |
| 2005/0091596 A1* | 4/2005 | Anthony et al. | 715/712 |
| 2006/0150123 A1* | 7/2006 | Goodwin et al. | 715/841 |
| 2006/0195790 A1 | 8/2006 | Beaupre et al. | |
| 2006/0236251 A1* | 10/2006 | Kataoka et al. | 715/757 |
| 2007/0033537 A1* | 2/2007 | Mander et al. | 715/764 |
| 2007/0044036 A1 | 2/2007 | Ishimura et al. | |
| 2007/0220441 A1 | 9/2007 | Melton et al. | |
| 2007/0271508 A1* | 11/2007 | Audet | 715/530 |
| 2008/0036743 A1 | 2/2008 | Westerman et al. | |
| 2008/0062141 A1 | 3/2008 | Chandhri | |
| 2008/0066135 A1 | 3/2008 | Brodersen et al. | |
| 2008/0167127 A1 | 7/2008 | Turkstra et al. | |
| 2008/0188209 A1 | 8/2008 | Dorogusker et al. | |
| 2008/0240675 A1* | 10/2008 | Berger et al. | 386/66 |
| 2009/0002335 A1 | 1/2009 | Chaudhri | |
| 2009/0177989 A1* | 7/2009 | Ma et al. | 715/766 |
| 2009/0307623 A1* | 12/2009 | Agarawala et al. | 715/765 |
| 2009/0319949 A1 | 12/2009 | Dowdy et al. | |

FOREIGN PATENT DOCUMENTS

| | | |
|---|---|---|
| WO | WO2006013485 A3 | 8/2006 |
| WO | WO2006020305 A3 | 5/2007 |
| WO | WO 2007121557 A1 * | 11/2007 |
| WO | WO2008033773 A1 | 3/2008 |
| WO | WO2008033853 A2 | 3/2008 |

OTHER PUBLICATIONS

Enright, "Dissatisfaction Sows Innovation—Visual Browsing in iTunes", The Treehouse+The Cave, Dec. 29, 2004, 1-4 pages.

Enright, "Meet CoverFlow", the Treehouse+The Cave, Aug. 13, 2005, 1-2 pages.

Enright, "Visual Browsing on a iBook DS", The Treehouse+The Cave, Dec. 29, 2004, 1 pg.

Sawyer, "Get with the CoverFlow", The Olive Press, Dec. 8, 2005, 1 pg.

Rose, "Music in the Home: Interfaces for Music Applications", Personal Technologies, v. 4, No. 1, 2000, pp. 45-53.

Hinze, Cody, "Cover Flow—A Beautiful Way to Browse your MP3s", Noise Magazine blog, Feb. 5, 2006, pp. 1-2.

* cited by examiner

| Remote Control Event | Reaction |
|---|---|
| Up (+) | Move focus up one item (or no-op if at top) and change submenu to show corresponding submenu for newly focused main menu item. (It should remember which submenu item was most recently selected and highlight that one.) |
| Hold Up | Scroll up (limit at top). Change contents after stopping. |
| Down (-) | Move focus down one item (or no-op if at bottom) and change submenu reflect new focus |
| Hold Down | Scroll down (limit at bottom) and change submenu after stopping. |
| Left (|<<) | no-op |
| Hold Left | no-op |
| Right (>>|) | Move focus to the right, into the contents submenu, selecting the most recent previous selection in that submenu (which should have some sort of visual highlight to indicate that it will gain focus). |
| Hold Right | Same as Right |
| Play/Pause/Select (>||) | Same as Right |
| Hold Play/Pause/Select (>||) | Standby? |
| MENU | Dismiss main/submenu without making any changes. |
| Hold MENU | no-op |

FIG. 5

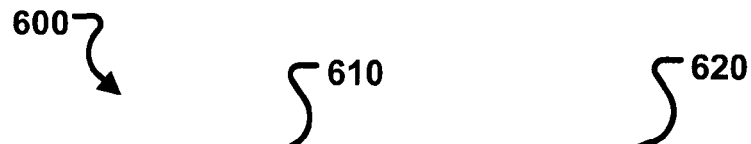

| Remote Control Event | Reaction |
|---|---|
| Up (+) | Move focus up one item in submenu (or no-op if at top). |
| Hold Up | Scroll up (limit at top). |
| Down (-) | Move focus down one submenu item (or no-op if at bottom). |
| Hold Down | Scroll down (limit at bottom). |
| Left (<<) | Move focus left into the main menu section of the control. (The current item gets the focus. For example, if you were in the TV Shows submenu, TV Shows would get the focus. The focus would NOT go to the nearest item.) |
| Hold Left | Same as Left. |
| Right (>>|) | no-op |
| Hold Right | no-op |
| Play/Pause/Select (>||) | Go into the selected area and dismiss the main/submenu control. |
| Hold Play/Pause/Select (>||) | Standby? |
| MENU | Dismiss main/submenu without making changes. |
| Hold MENU | no-op |

FIG. 6

| Main Menu Item | Submenu Item | Content Description | Rules & Notes |
|---|---|---|---|
| Movies | Trailers | List of grids of theatrical trailers | Same source as ATV1.1 |
| | Rented | Current Rented Movies | Also can have suggestions for other movies based on the current rented movies. |
| | Top Movies | iTunes stores movies with different section, such as: New, Featured, Top Ten, etc. | iTunes Store feed determines content and titles of sections. |
| | Featured (optional) | An optional section for featured movies split out from Top movies. | The item will be in the sub-menu if it is in the iTS feed. |
| | Genres | List of Genres | List sent in store feed. |
| | Search | No content | Searches the iTunes Store movies |
| | My Movies | Purchased Movies, Other Movies (home movie library.) | Only shows when there is owned content (synced, or purchased from Apple TV). Also access to movies on shared computers goes here. |
| | Shared Movies | Movies from shared libraries on other computers on the local network. | Only appears when Apple TV has been connected for sharing to at least one additional iTunes Library. |
| TV Shows | Favorites | List of TV shows that user has added to favorites. Each folder contains both the downloaded episodes as well as episodes available from the store. | The Show folder contains all seasons. The most recent season is the first level inside the folder with a link to other seasons. |
| | Top TV Shows | iTunes Store TV Shows, with sections such as Featured, Top Episodes, Top Seasons, New, etc. | iTunes Store feed determines content and titles of sections. |
| | Featured (optional) | An optional section for Featured TV shows split out from Top TV shows. | The item will be in the submenu if it is in the iTS feed. |
| | Genres | List of Genres | List sent in store feed. |
| | TV Networks | List of TV Networks | List sent in store feed. |
| | Search | No content | Searches the iTunes Store TV Shows |
| | My TV Shows | TV show folders for shows that the user has purchased or watched | A TV show folder will get added to this list for the following reasons:<br>- User purchases an episode from Apple TV<br>- Synced iTunes library TV shows<br>Also, access to TV shows on shared computers goes here. |

| Main Menu Item | Submenu Item 2220 | Content Description 2230 | Rules & Notes 2240 |
|---|---|---|---|
| 2210 | Shared TV Shows | TV shows from shared libraries from other computers on the local network. | Only Appears when the Apple TV has been connected for sharing to at least one additional iTunes Library. |
| Music | Now Playing | Takes you directly to the Now Playing Screen. | Only appears if music is playing or paused. (Same rule as ATV 1.) |
| | Top Music | iTunes Store music with sections such as New, Featured, Top Songs, Top Albums, etc. | iTunes store feed determines content and title of sections, but may also emphasize music videos. |
| | Featured (optional) | An optional section for Featured Music split out from Top Music. | The item will be in the submenu if it is in the iTS feed. |
| | Music Videos | Main page for music video. | Contents determined by iTS feed. |
| | Genres | List of Genres | List sent in store feed. |
| | New Releases | New music releases, either in one list or grid, or in sections such as This Week, Last Week, or by genre. | iTunes store feed determines content and title of sections. Could have deeper levels of navigation. |
| | Search | No content | Searches the iTunes Store music |
| | My Music | Very similar to ATV.1 Music section, including Now Playing, Shuffle Songs, Albums, Playlists, Music Videos, etc. | All music purchased on Apple TV or in the synced iTunes Library. Also, access to music on shared computers goes here. |
| | Shared Music | Music from shared libraries on other computers on the local network. | Only appears when Apple TV has been connected for sharing to at least one additional iTunes Library. |
| Podcasts | Favorites | Analogous to TV Shows Favorites | |
| | Top Podcasts | iTunes Store podcasts with sections such as New, Featured, Top, The News, etc. | iTunes Store feed determines content and titles of sections. |
| | Featured (optional) | An optional section for Featured podcasts split out from Top Podcasts. | The item will be in the submenu if it is in the iTS feed. |
| | Genres | List of Genres | List sent in store feed. |
| | Providers | List of Featured Podcast Providers. | List sent in store feed. |
| | Search | No content | Searches the iTunes Store podcasts |
| | My Podcasts | Podcast Show Folders for podcasts the user has Subscribed to from Apple TV or synched. | Also access to podcasts on shared computers goes here. |

FIG. 22

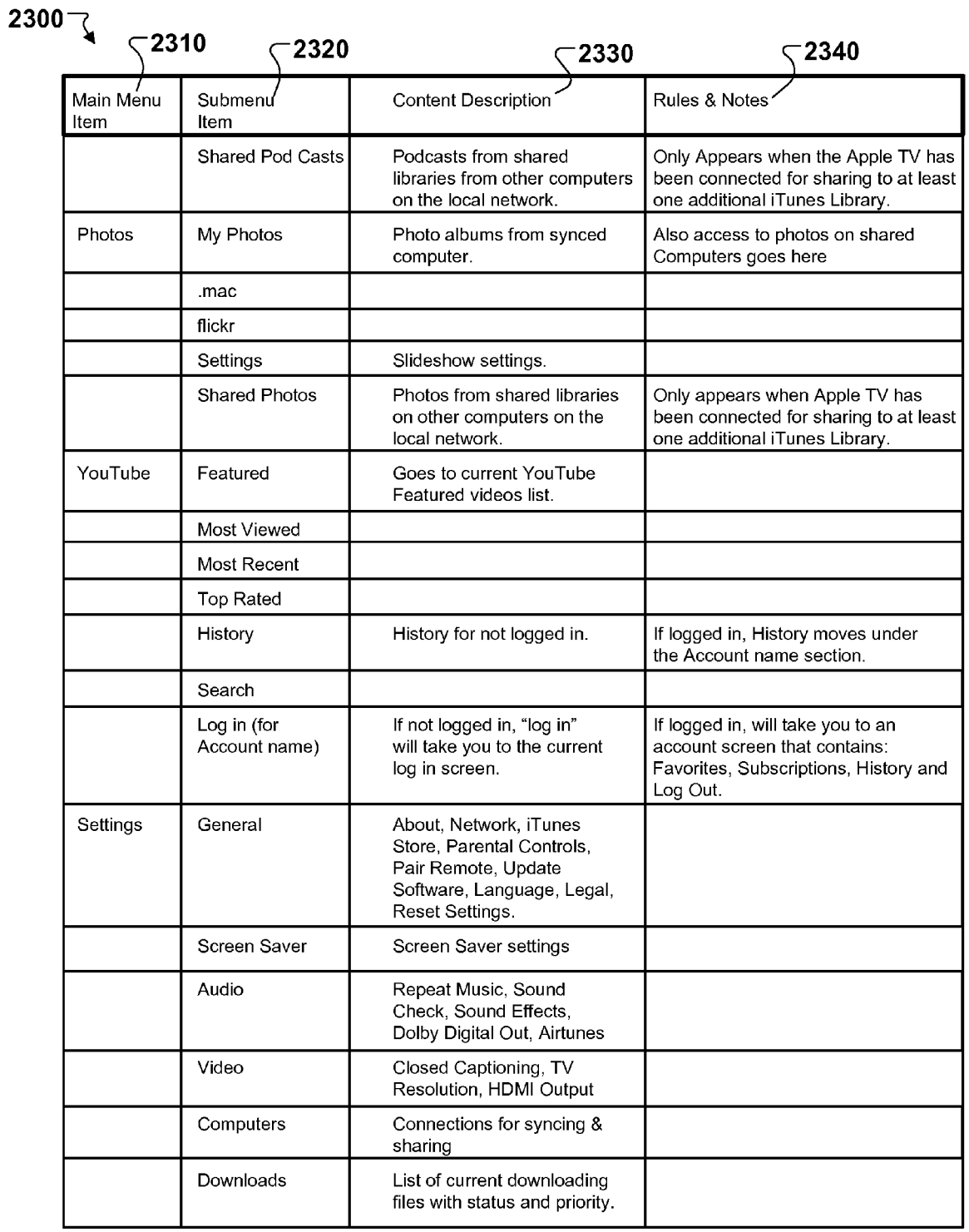

| Main Menu Item | Submenu Item | Content Description | Rules & Notes |
|---|---|---|---|
| | Shared Pod Casts | Podcasts from shared libraries from other computers on the local network. | Only Appears when the Apple TV has been connected for sharing to at least one additional iTunes Library. |
| Photos | My Photos | Photo albums from synced computer. | Also access to photos on shared Computers goes here |
| | .mac | | |
| | flickr | | |
| | Settings | Slideshow settings. | |
| | Shared Photos | Photos from shared libraries on other computers on the local network. | Only appears when Apple TV has been connected for sharing to at least one additional iTunes Library. |
| YouTube | Featured | Goes to current YouTube Featured videos list. | |
| | Most Viewed | | |
| | Most Recent | | |
| | Top Rated | | |
| | History | History for not logged in. | If logged in, History moves under the Account name section. |
| | Search | | |
| | Log in (for Account name) | If not logged in, "log in" will take you to the current log in screen. | If logged in, will take you to an account screen that contains: Favorites, Subscriptions, History and Log Out. |
| Settings | General | About, Network, iTunes Store, Parental Controls, Pair Remote, Update Software, Language, Legal, Reset Settings. | |
| | Screen Saver | Screen Saver settings | |
| | Audio | Repeat Music, Sound Check, Sound Effects, Dolby Digital Out, Airtunes | |
| | Video | Closed Captioning, TV Resolution, HDMI Output | |
| | Computers | Connections for syncing & sharing | |
| | Downloads | List of current downloading files with status and priority. | |

FIG. 23

| Remote Control Event | Reaction |
| --- | --- |
| Up (+) | Move highlight up to nearest selectable item above (or no-op if at top) |
| Hold Up | Continuously move highlight up (limit at top). |
| Down (-) | Move highlight down to nearest selectable item below (or no-op if at bottom). |
| Hold Down | Continuously move highlight down (limit at bottom). |
| Left (\|<<) | Move highlight to the left, or, if at left edge of content area, move highlight into the submenu, landing on the submenu item that corresponds to the content area shown (not necessarily the nearest submenu item). If there are tilted items to the left of the highlighted item, pressing Left will flatten out the first item to the left and highlight it. |
| Hold Left | Continuously move the highlight to the left, flattening out tilted items as appropriate, stopping at the left-most item on the shelf. Or, if at left-most item on the shelf, move highlight back into submenu. |
| Right (>>\|) | Move highlight to the right, flattening out tilted items as appropriate (and causing items on the left side of the shelf to tilt). |
| Hold Right | Continuously move the highlight to the right, flattening out tilted items as appropriate, limit at right edge. |
| Play/Pause/Select (>\|\|) | Go into a new screen for the selected item. (For example, go into the Movie details screen if a movie poster was highlighted.) |
| Hold Play/Pause/Select (>\|\|) | Standby? |
| MENU | return to submenu |
| Hold MENU | Return to main menu |

FIG. 27

Display Representation of Available Content Items Arranged in One or More Rows
2820

Provide User Selectable Area to Display a Predetermined Number of the Available Content Items in Each Row
2822

Provide a Non-Selectable Area to Display Other Available Content Items Not Displayed in the User-Selectable Area in Each Row
2824

FIG. 28B

Display Visual Indication
2912

Display User-Selectable Images Representing A Predetermined of Available Content Items Arranged in a Non-Overlapping Manner
2922

Displaying Non-Selectable Images Representing Other Available Content Items Not Represented By the User-Selectable Images Arranged in an Overlapping Manner
2924

FIG. 29C

USER INTERFACE FOR SELECTION FROM MEDIA COLLECTION

CLAIM OF PRIORITY

This application claims priority under 35 USC §119(e) to U.S. Patent Application Ser. No. 61/019,192, filed on Jan. 4, 2008, the entire contents of which are hereby incorporated by reference.

TECHNICAL FIELD

This application relates to graphical user interfaces (GUIs).

BACKGROUND

Computing devices, such as personal computers can be used to view digital content, such as movies, television shows, music, photos, etc. purchased or rented from a remote source. Locating desired content to rent or purchase from the remote source often can involve non-intuitive user interactions and selections. Further, once the rented or purchased movie is downloaded, navigating through the user owned or rented content often can be difficult.

SUMMARY

Among other things, techniques and systems are disclosed for providing a GUI to enable user navigation and/or selection from available content.

In one aspect, a system for navigating available content includes a content source and a graphical user interface communicatively connected to the content source. The graphical user interface includes a user input area to receive user input and a display area to display available content items from the content source based on the received user input. The display area includes a presentation of the available content arranged in one or more rows. Each row includes a user selectable area to display at least one visual indication that represents one or more of the available content items. Also, each row includes a holding area to display another visual indication that represents other available content items not displayed in the user selectable area. Further, the display area includes highlighting positioned over one of the available content items. The highlighting is designed to move from one available content item to another across the one or more rows in response to the received user input.

Implementations can optionally include one or more of the following features. The holding area can include a non-selectable area. The one or more rows can be displayed horizontally. Alternatively, the one or more rows can be displayed vertically. The user input area can include a main menu to provide a presentation of user selectable content categories. The main menu can be designed to provide a presentation of user selectable content categories comprising movies, television shows, music, or photos. The user input area can include a submenu to provide a presentation of user selectable content subcategories for each user selectable content category. The user selectable content subcategories can include movie genres or music genres. The user selectable area can include a user selection to preview the available content items. Further, the user selectable area can include a user selectable presentation of recommended available content items. The at least one visual indication that represents one or more of the available content items can include user-selectable images arranged in a non-overlapping manner, and the another visual indication that represents other available content items can include non-selectable images arranged in an overlapping manner. The non-selectable images can be designed to be rearranged to user-selectable images in a non-overlapping manner as the highlighting moves across the rows or columns. Also, the content source can include a computing system, a network server, a database, a storage device, or an Internet website.

In another aspect, a computer implemented method can include receiving user input and displaying a presentation of available content items arranged in one or more rows. Displaying the presentation also includes providing a user-selectable area to display a predetermined number of the available content items in each row, and providing a non-selectable area to display other available content items not displayed in the user-selectable area in each row. In addition, highlighting is positioned over one of the available content items. Further, based on the received user input, the highlighting is moved from one available content item to another across the one or more rows.

Implementations can optionally include one or more of the following features. The computer implemented method can include displaying the one or more rows horizontally. Alternatively, the one or more rows can be displayed vertically.

In another aspect, a computer implemented method includes providing a graphical user interface to enable a user to navigate through content items available from one or more local or remote content sources. Providing the graphical user interface includes displaying a visual indication of the available content items arranged in rows by content categories. Displaying the visual indication includes displaying user-selectable images representing a predetermined number of available content items arranged in a non-overlapping manner. Also, displaying the visual indication includes displaying non-selectable images representing other available content items not represented by the user-selectable images arranged in an overlapping manner.

Implementations can optionally include one or more of the following features. The computer implemented method can also include receiving user input, and based on received user input, positioning highlighting over one of the user-selectable images representing one of the available content items. In addition, the highlighting can be moved across the user-selectable images based on the received user input. Also, based on the received user input, when the highlighting is moved across the rows, the non-selectable images can be changed to user-selectable images and the highlighting can be positioned over the user-selectable images that have been changed from the non-selectable overlapping images. Providing the graphical user interface can further include displaying a main menu to provide a presentation of content categories, and displaying a sub menu to provide a presentation of content subcategories for each content category.

In another aspect, a computer program product, embodied on a computer-readable medium, can be operable to cause a data processing apparatus to perform operations including receiving user input. Also, the computer program product can be operable to cause a data processing apparatus to display a presentation of available content items arranged in one or more rows. The computer program product can be operable to display the presentation by providing a user-selectable area to display a predetermined number of the available content items in each row. In addition, the computer program product can be operable to display the presentation by providing a holding area to display other available content items not displayed in the user-selectable area in each row. Also, the computer program product can be operable to position highlighting over one of the available content items, and move the highlighting from one available content item to another across the one or more rows in response to the received user input.

Yet in another aspect, a computer program product, embodied on a computer-readable medium, can be operable to cause a data processing apparatus to perform operations including providing a graphical user interface to enable a user to navigate through content items available from one or more local or remote content sources. The computer program product can be operable to provide the graphical user interface by displaying a visual indication of the available content items arranged in rows by content categories. The computer program product can be operable to display the visual indication by displaying user-selectable images representing a predetermined number of available content items arranged in a non-overlapping manner and displaying non-selectable images representing other available content items not represented by the user-selectable images arranged in an overlapping manner.

Implementations can optionally include one or more of the following features. The computer program product can be operable to cause a data processing apparatus to receive user input, and based on received user input, position highlighting over one of the user-selectable images representing at least one of the available content items. In addition, the highlighting can be moved across the user-selectable images in response to the received user input. Also, the computer program product can be further operable to cause a data processing apparatus to based on the received user input, when the highlighting is moved across the rows, change the non-selectable images to user-selectable images and position the highlighting over the selectable images that have been changed from the non-selectable overlapping images. The computer program product can be further operable to provide the graphical user interface by displaying a main menu to provide a choice of the content categories and displaying a sub menu to provide a choice of content subcategories for each content category. The computer program product can be further operable to display user-selections to enable a user to preview the available content items. The computer program product can be further operable to display the one or more rows horizontally. The computer program product can be further operable to display the one or more rows vertically.

Techniques and systems according to the present specification can be implemented to potentially provide various advantages. For example, the available content items can be displayed to the user to be selected. The available content items can be displayed organized by content categories, such as movie genres. In addition, a presentation of the available content items can be displayed to enable the user to efficiently navigate through the available content items.

BRIEF DESCRIPTION OF THE DRAWINGS

FIG. 3 shows an example GUI screen displaying available movies.

FIG. 5 is a table describing example remote control events when focus is on main menu control.

FIG. 6 is a table describing example remote control events when focus is on submenu control.

FIGS. 21, 22 and 23 are tables showing example organization of GUI screens.

FIG. 27 is a table showing example remote control events for various shelves.

FIGS. 28A and 28B show an example process for enabling a user to navigate available content items.

FIGS. 29A, 29B and 29C show an example process of providing a graphical user interface to a user.

Like reference symbols and designations in the various drawings indicate like elements.

DETAILED DESCRIPTION

Techniques and systems are disclosed for provide a GUI that enables a user to navigate available content.

Figure 1:
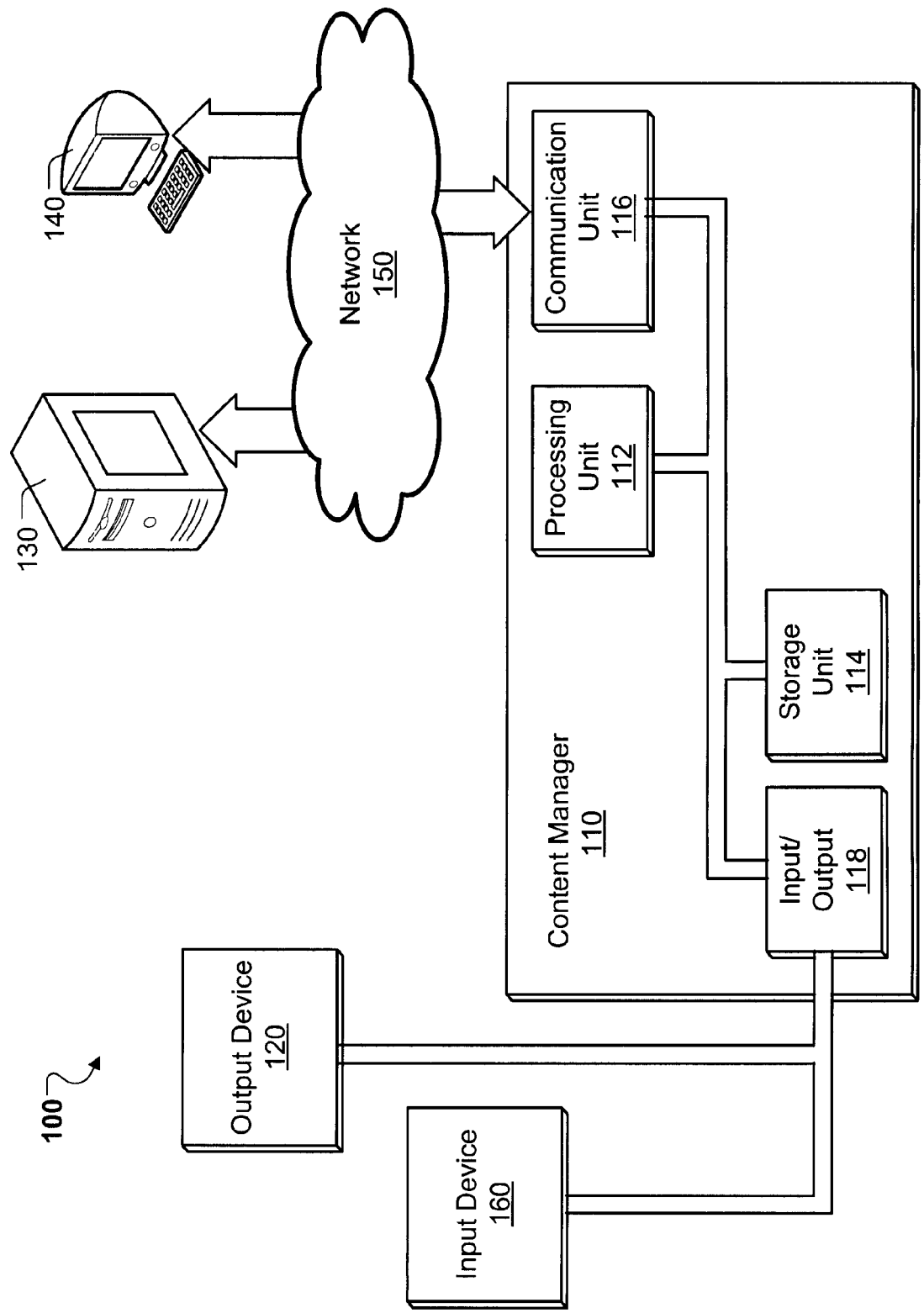
FIG. 1 is a block diagram illustrating an example system for providing a graphical user interface (GUI) to a user.

FIG. 1 is a block diagram illustrating an example system 100 for providing a graphical user interface (GUI) to a user. The GUI enables the user to navigate and/or select from a content or media collection available on local and/or remote locations. The available content or media includes videos, audios, images, etc. One or more external content sources 130, 140 can be communicatively connected, through a network 150, to a content or media manger 110. Once connected, the content or media manager 110 can access the remote content or media available on the one or more external content or media sources 130, 140. The content or media manger 110 can send the accessed content or media to an output device 120. In addition, an input device 160 can be connected to the content or media manager 110 to provide user input to the content or media manager 110.

The remote content or media sources 130, 140 can include various computing devices such as a personal computer, a mobile computing device, a network terminal, a network server, etc. that can provide content or media to the content or media manager 110. The content or media manager 110 can include various hardware and/or software units including a processing unit 112, a storage unit 114, a communication unit 116, and an input/output (I/O) interface 118.

The storage unit 114 can locally store various content or media, and the content or media manager 110 can access and manage the local content or media stored in the storage unit 114. In some implementations, the content or media manager 110 can manage and access both locally stored content or media and remotely stored content or media.

The network 110 includes a dedicated network such as a local area network (LAN) and a wide area network (WAN). Alternatively, the network 110 can include an open network such as the internet. Connections to the network 110 can be enabled using a wired or wireless communication link. The wired connection can include Universal Serial Bus (USB), firewire, serial, parallel, etc. The wireless connection can include Bluetooth, Wifi, WiMax, infrared, etc.

The content or media manger 110 processes the user input received through the input device and the processed input is mapped to one or more functions associated with a GUI application. The associated GUI functions include content or media selection, content or media search, content or media storage, content or media playback, etc. In addition, the GUI application provides a visual interface to enable the user to manage and navigate the locally and remotely available content or media.

Figure 2:
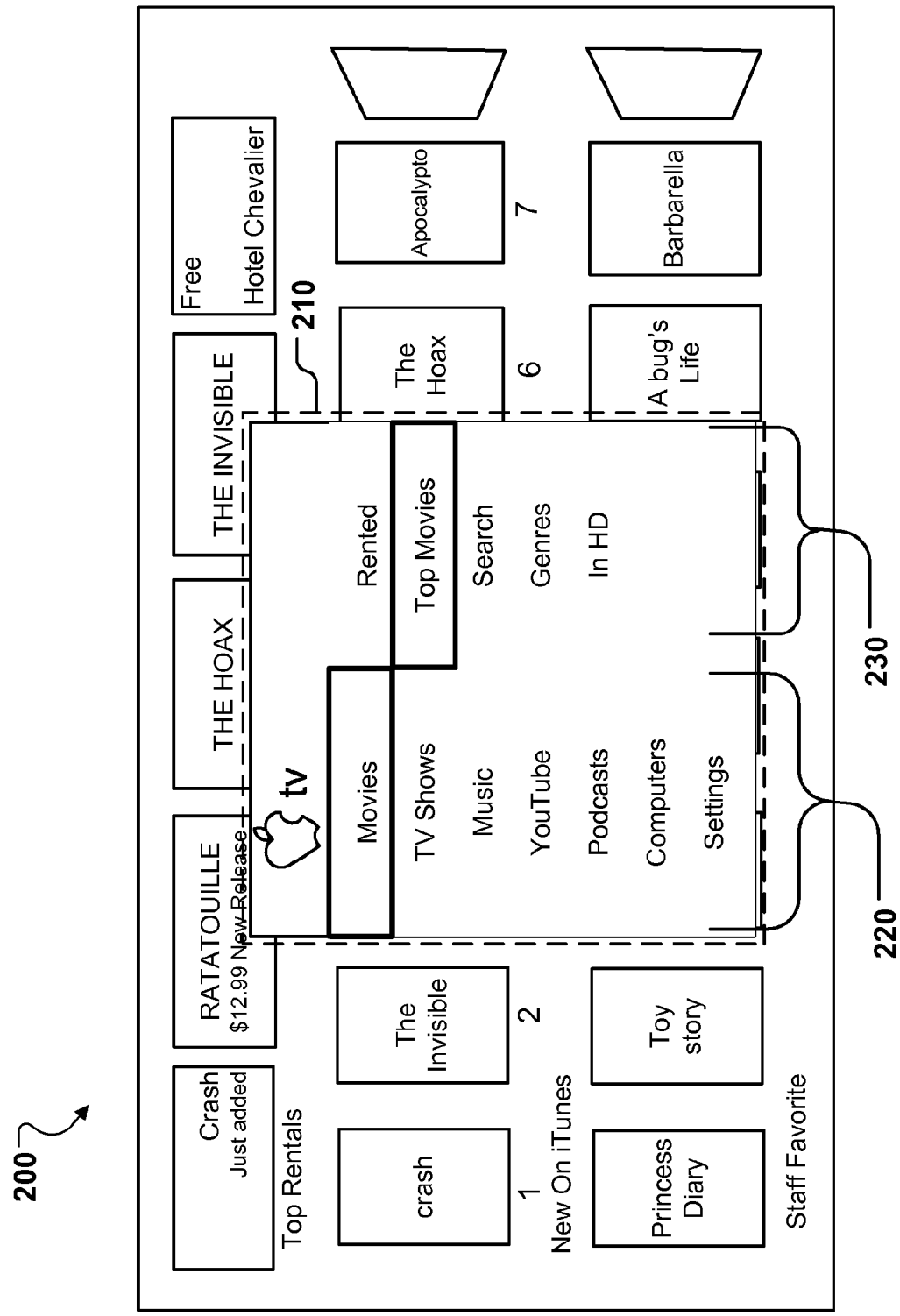
FIG. 2 shows an example GUI screen that includes example input fields

FIGS. 2-20 illustrate various example screens of a GUI 200 presented to a user. FIG. 2 shows an example GUI screen that includes example input fields 210 to enable the user to navigate and/or select from one or more content collections. The example input fields 210 can be hierarchically organized in various tiers or levels. For example, the example input fields 210 can be organized as a main menu 220 with various submenus 230 located under the main menu 220. The main menu 220 and first-level submenus 230 can have the organization, look and interaction that incorporate the one or more remote content or media sources 130, 140 (e.g., the iTunes online store) and a new syncing paradigm or a grand unified theory.

The main menu 220 can include various user selectable content or media categories such as Movies, TV Shows, Music, Podcasts, Photos, and user created content or media (e.g., YouTube videos). In addition, the main menu 220 can include other categories such as Settings that enable the user to adjust the look-and-feel of the GUI environment. In addition, the Settings category can enable the user to set-up connections to the remote content or media sources 130, 140.

The submenu 230 under the main menu 220 can include various category dependent subcategories. For example, the Movies category can include movie-related content or media such as Theatrical Trailers, iTunes Top Movies, a list of movies available through the content or media manager 110, etc.

Figure 3:
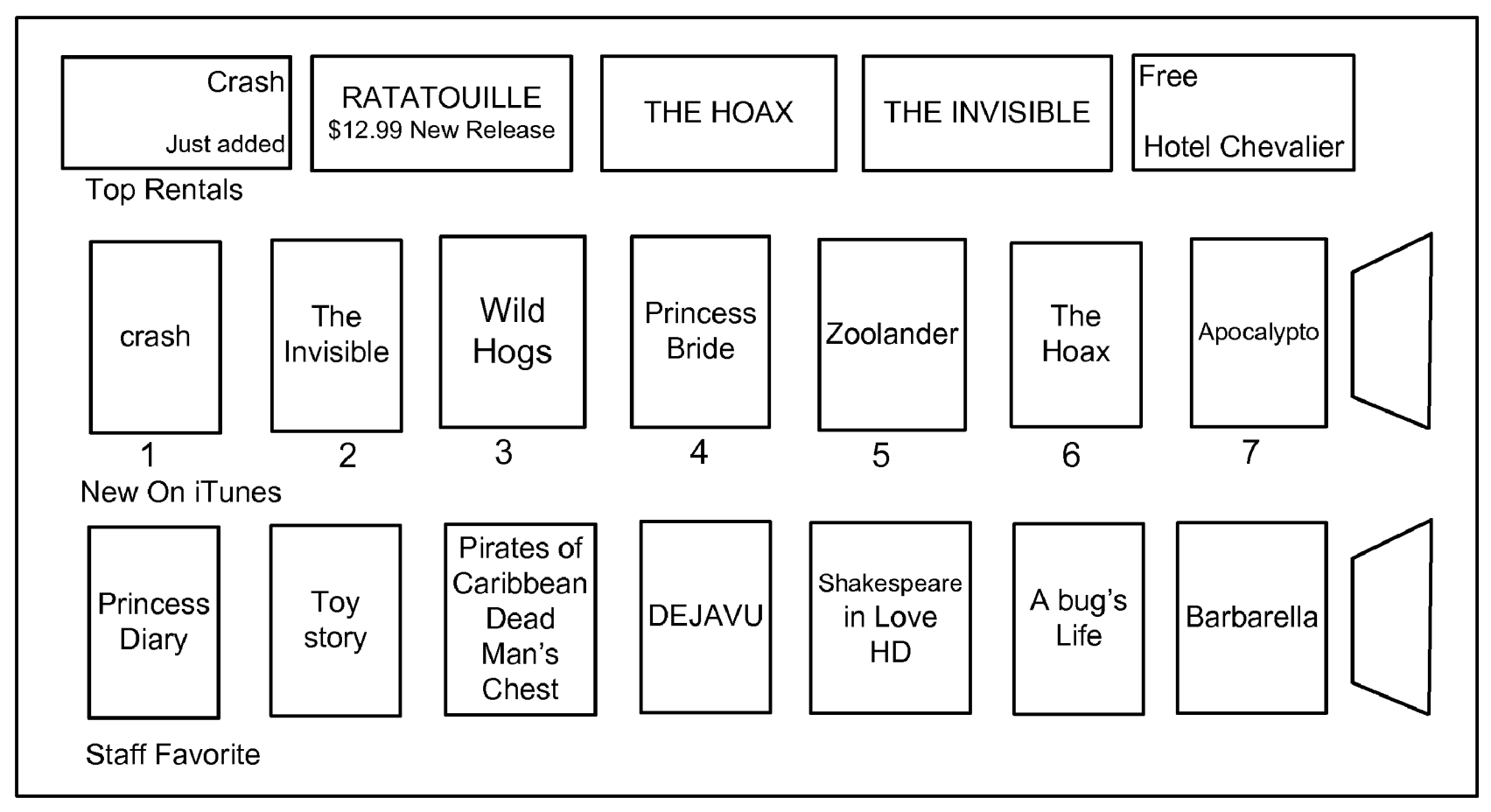

FIG. 3 shows an example GUI screen with thumbnail-type images representing some of the available movies.

Figure 4:
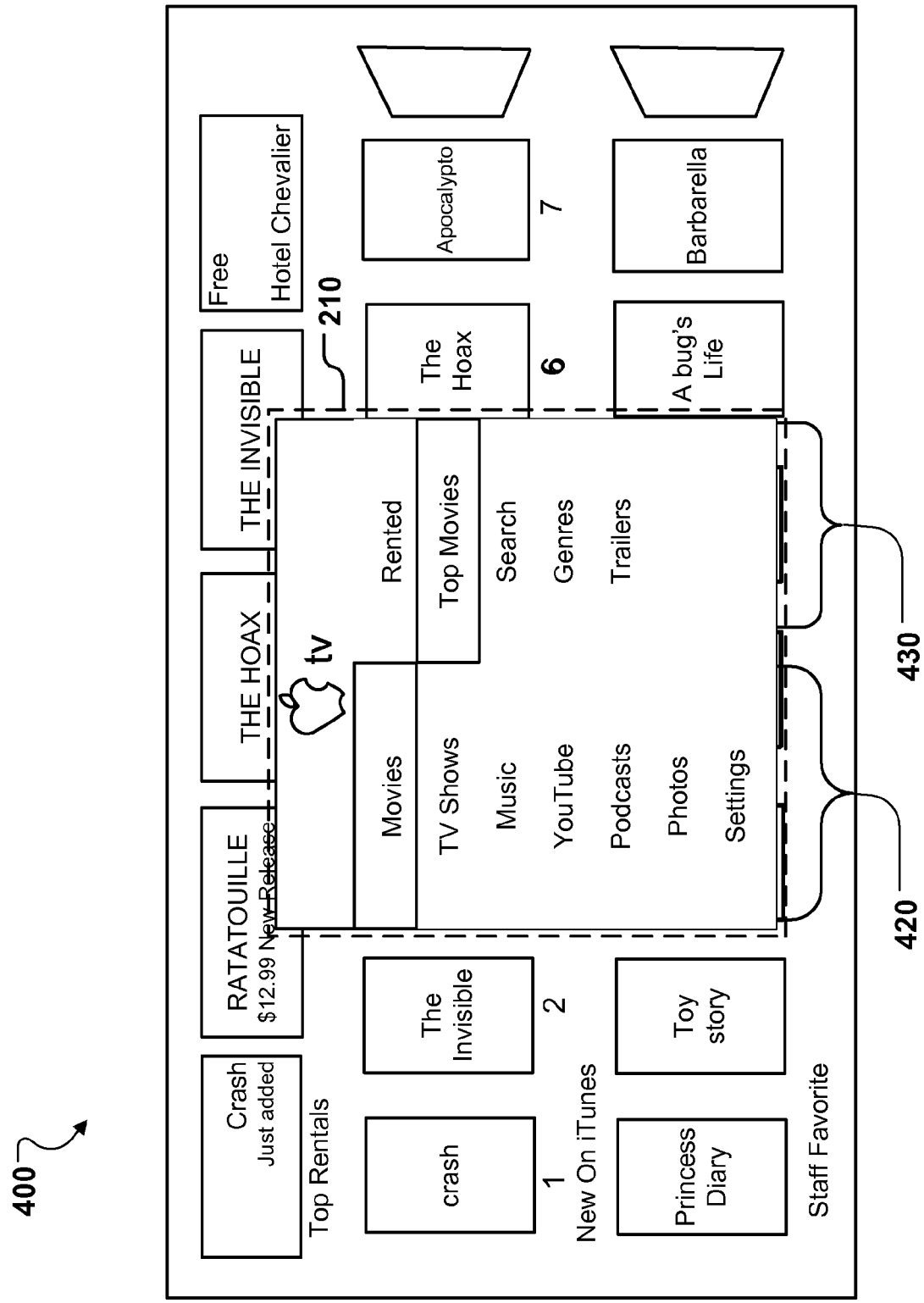
FIG. 4 shows another example GUI screen that includes example input fields.

FIG. 4 shows another example GUI screen 400. Example input fields 410 are shown with an alternate listing of submenu 430 categories under the Movies main menu. The alternate submenu categories can include subcategories related to a movie rental environment. Example submenu categories for the Movies submenu can include Movies, Rented Movies, My Movies, Top Movies, Search, Genres and Trailers.

"Rented Movies" subcategory can provide a list of all rented movies, with a list of recommendations for the user. "My Movies" can list all of the user's synced movies and enable the user to access content or media available in shared iTunes libraries. The iTunes libraries and connections for local and remote content or media sources 130, 140 can be configured using the Settings category in the main menu 420. "Top Movies" subcategory can be implemented as the main page for various content or media sources, such as the iTunes Movie Store for Apple TV. The "Search" subcategory can enable the user to search for desired content or media (e.g., movies) on the various content or media sources including the remote content or media sources 130, 140 (e.g., iTunes store). "Genres" subcategory can enable the user to browse or navigate the available remote and local movies by genre. "Theatrical Trailers" is a subcategory that enables the user to watch the latest movie trailers.

The example user input fields 410 can include a main menu 420 and a submenu 430 displayed as a floating unit above the presentation 402 of content or media (e.g., list of movies) in the background. This enables the user to navigate around the menu 420 and submenu 430 and go back into the content or media listing.

In some implementations, different placements & icons can be used instead of just plain text for the menu 420 and submenu 430 items.

In operation, the listing of content or media below the floating menu 420 and submenu 430 does not change as the user focuses on different menu/submenu items. The menu 420 and submenu 430 can change in reaction to the user pressing a physical input element on an input device (e.g., a mouse click, a button press on a remote control device, or a key-press on a keyboard.) For example, when the user presses the Select (>||) button on a remote control device, the menu/submenu unit is dismissed and the user is presented with a new GUI screen representing the selected area.

User interaction with the Main menu 420/Submenu 430 control unit can depend on the look-and-feel of the GUI environment configured using the Settings section. The main menu 420/submenu 430 control unit can appear when the user presses MENU from the top level of each subsection. In lower levels, pressing MENU can act like a back button. For example, when watching a rented movie, the hierarchy of the MENU can include the following:

---
Movies: Rented
Movie Details Screen
Video Playback Screen
---

When the user presses MENU, the movie (with a bookmark) stops and the user is taken back to the Movie Details Screen. Pressing MENU again takes the user to the Rented screen that shows the list of rented movies. Pressing MENU once more can bring up the main menu 420/submenu 430 control unit.

When the user presses & holds MENU, the main menu 420/submenu 430 control unit is displayed on top of the paused video.

When the user presses MENU to display the main menu 420/submenu 430 control unit, the main menu 420/submenu 430 control unit can be shown with the focus on the right side, in the submenu 430 section. When the user presses & holds MENU, the focus is placed on the left side, in the main menu 420 section.

The following is a brief overview of remote control interactions for the main menu 420/submenu 430.

Left (|<<) and Right (>>|) GUI elements can take the user back and forth between the two sides (main menu 420 and submenu 430).

Select can move the focus from the main menu 420 into the submenu 430. If the focus is already in the submenu 430, Select can present to the user the selected area, such as Movies—Top Movies, or Music—Search.

MENU can dismiss the main menu 420/submenu 430 without making any changes to what was showing before the main menu 420/submenu 430 was displayed, even if the user has navigated around inside the menu.

Thus, the user can summon the main menu 420/submenu 430 control unit by pressing MENU (if the user is in the top screen for a particular area) or pressing & holding MENU from anywhere.

To dismiss the main menu 420/submenu 430 control unit and return to a previous GUI screen without making any changes, the user can simply press MENU again.

To move to a new GUI screen, the user can navigate in the main menu 420/submenu 430 control unit to the desired area and press Select.

FIGS. 5 and 6 are tables describing example details of the remote control interaction for the main menu 420/submenu 430 control unit displayed on-screen. Note that the navigation is not grid-like. In other words, up & down selections can take the user up and down within each list (main menu 420 & submenu 430), but left and right do not move the user to the closest item to the left or right. Instead, the left and right moves the focus to the currently highlighted item. For example, in the Movies submenu with the focus down on the last item (Theatrical Trailers), pressing left takes the user to Movies even though the closest item to the left is the Photos section.

FIG. 5 is a table 500 that describes example remote control events when the focus is on the main menu portion of the main menu 420/submenu 430 control. The table 500 includes a first column 510 and a second column 520. The first column 510 describes the remote control events in response to user input. The second column 520 describes the resultant GUI operations in response to the remote control events. For example, when the "Up (+)" button is actuated by user input, the focus is moved up one main menu selection item and the submenu is changed to correspond to the newly focused main menu selection item. Also, a presentation (e.g., 402) of the available content or media can be changed to correspond to the newly selected main menu and submenu. Alternatively, no operation is performed when the user is already at the top main menu selection item. In addition, the system can remember the most recently selected submenu item and that submenu item is highlighted (focused). When the "Up (+)" button is actuated by user input and held in place, the main menu items are scrolled up until the topmost main menu item is reached. The presentation of the available content or media changes to correspond to the selected main menu and the submenu when the scrolling stops.

When the "Down (−)" button is actuated by user input, the focus or highlighting is moved down one main menu item and the submenu item associated with the newly selected main menu item is focused. Further, the presentation of the available content or media can be changed to correspond to the newly selected main menu and submenu. When the "Down (−)" button is actuated by user input and held in place, the main menu items are scrolled down until the bottommost main menu item is reached. The presentation of the available content or media changes to correspond to the selected main menu and the submenu when the scrolling stops.

When the "Left (|<<)" button is actuated by user input, no operations are performed. When the "Left (|<<)" button is actuated by user input and held in place, no operations are performed.

When the "Right (|>>)" button is actuated by user input, the focus is moved right to the available submenu choices for the selected main menu item. The most recently selected submenu item is remembered and selected. In some implementations, the first submenu item is selected. The selection of the submenu item is indicated by a visual indication such as highlighting. When the "Right (|>>)" button is actuated by user input and held in place, the same operation is performed as when the "Right (|>>)" button is actuated once by user input. In addition, when the "Play/Pause/Select (>||)" button is selected, the same operations as is performed as when the "Right (|>>)" button is actuated once by user input. When the "Play/Pause/Select (>||)" button is selected and held in place, the standby mode is entered.

When the "Menu" button is actuated by user input, the main menu/submenu control is dismissed or exited without performing any operations. When the "Hold Menu" button is actuated by user input, no operations are performed.

FIG. 6 is a table 600 that describes example remote control events when the focus is on the submenu 430 portion of the main menu 420/submenu 430 control. The table 600 includes a first column 610 and a second column 620. The first column 610 describes the remote control events in response to user input. The second column 620 describes the resultant GUI reaction in response to the remote control event. For example, when the "Up (+)" button is actuated by user input, the focus is moved up one submenu selection item. Also, a presentation (e.g., 402) of the available content or media can be changed to correspond to the newly selected submenu item. Alternatively, no operation is performed when the user is already at the top submenu selection item. When the "Up (+)" button is actuated by user input and held in place, the submenu items are scrolled up until the topmost submenu item is reached. The presentation of the available content or media changes to correspond to the selected submenu when the scrolling stops.

When the "Down (−)" button is actuated by user input, the focus or highlighting is moved down one submenu item. The presentation of the available content or media can be changed to correspond to the newly selected submenu item. When the "Down (−)" button is actuated by user input and held in place, the submenu items are scrolled down until the bottommost submenu item is reached. The presentation of the available content or media changes to correspond to the newly selected submenu item when the scrolling stops.

When the "Left (|<<)" button is actuated by user input, the focus is moved to the main menu control portion and the current main menu item gets the focus (e.g., using highlighting). For example, when moving focus from the TV submenu, the TV main menu item gets the focus. In some implementations, the focus is moved to the nearest main menu item. When the "Left (|<<)" button is actuated by user input and held in place, the same operations are performed as when the "Left (|<<)" button is actuated by user input.

When the "Right (|>>)" button is actuated by user input, no operations are performed. When the "Right (|>>)" button is actuated by user input and held in place, no operations are performed. In addition, when the "Play/Pause/Select (>||)" button is selected, the display area corresponding to the selected submenu item is displayed. For example, the display area for the selected movie genre submenu can be displayed. When the "Play/Pause/Select (>||)" button is selected and held in place, the standby mode is entered.

When the "Menu" button is actuated by user input, the main menu/submenu control is dismissed or exited without performing any operations. When the "Hold Menu" button is actuated by user input and held in place, no operations are performed.

Figure 7:
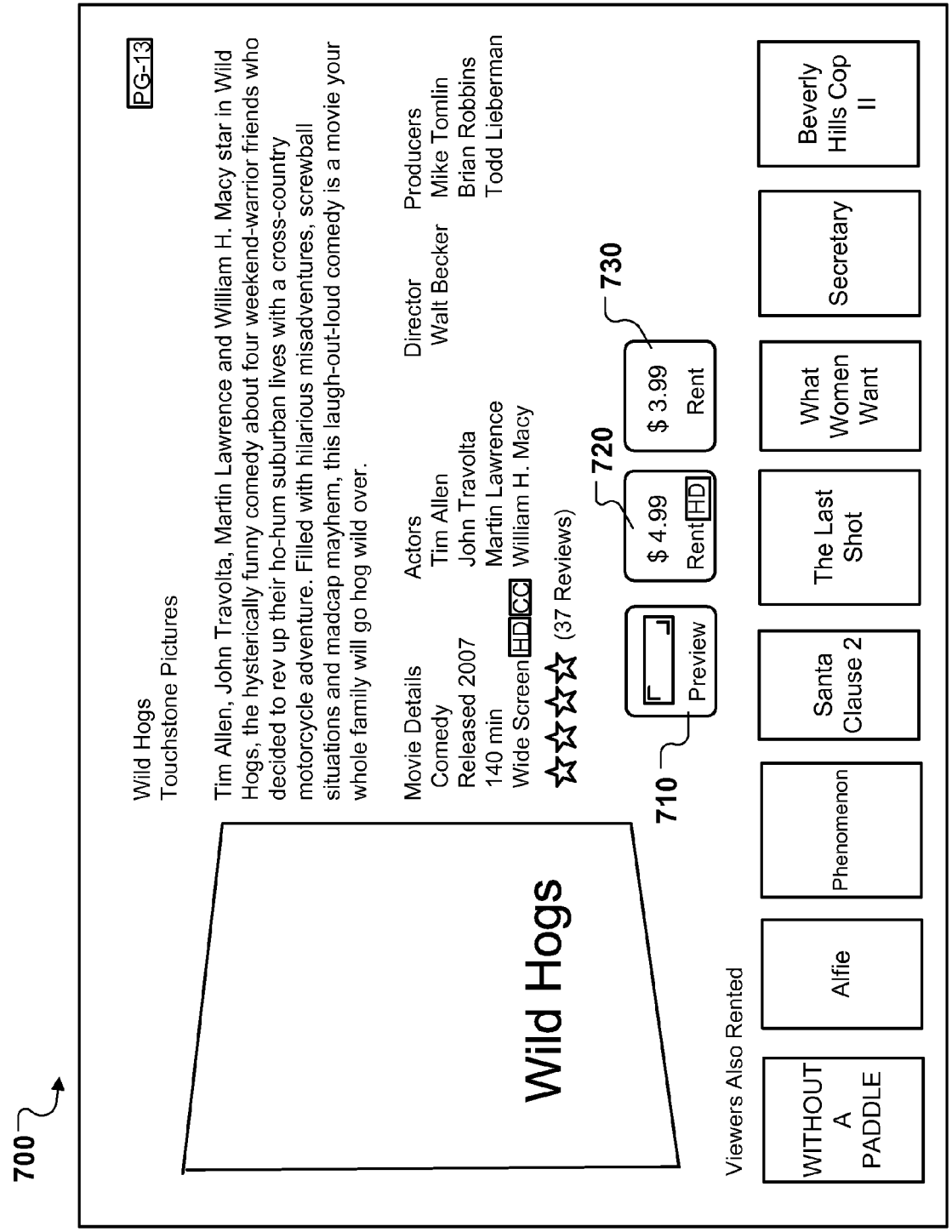
FIG. 7 shows an example GUI screen for displaying details for each movie.

FIG. 7 shows an example GUI screen 700 for displaying details for each movie. For example, a short synopsis of the plot along with a listing of the actors, director, producers are shown. Additional movie related information such as the genre of the movie (e.g., comedy, drama, etc.), the year of release, length of the movie, movie ratings, etc. can be shown. In addition, user selectable GUI elements 710, 720, 730 can be displayed to enable the user to provide user selections. For example, the user can interact with the GUI elements 710, 720 and 730 to play a preview of the movie, rent the HD version of the movie or rent the regular version of the movie respectively. Other interactive functions can be provided by incorporating addition GUI elements.

Further, a list of movies rented by other users can be displayed. For example, the list can include those movies rented by other users who have also rented the movie selected. Such list of movies rented by other users can function as a recommendation mechanism for the current user.

Figure 8:
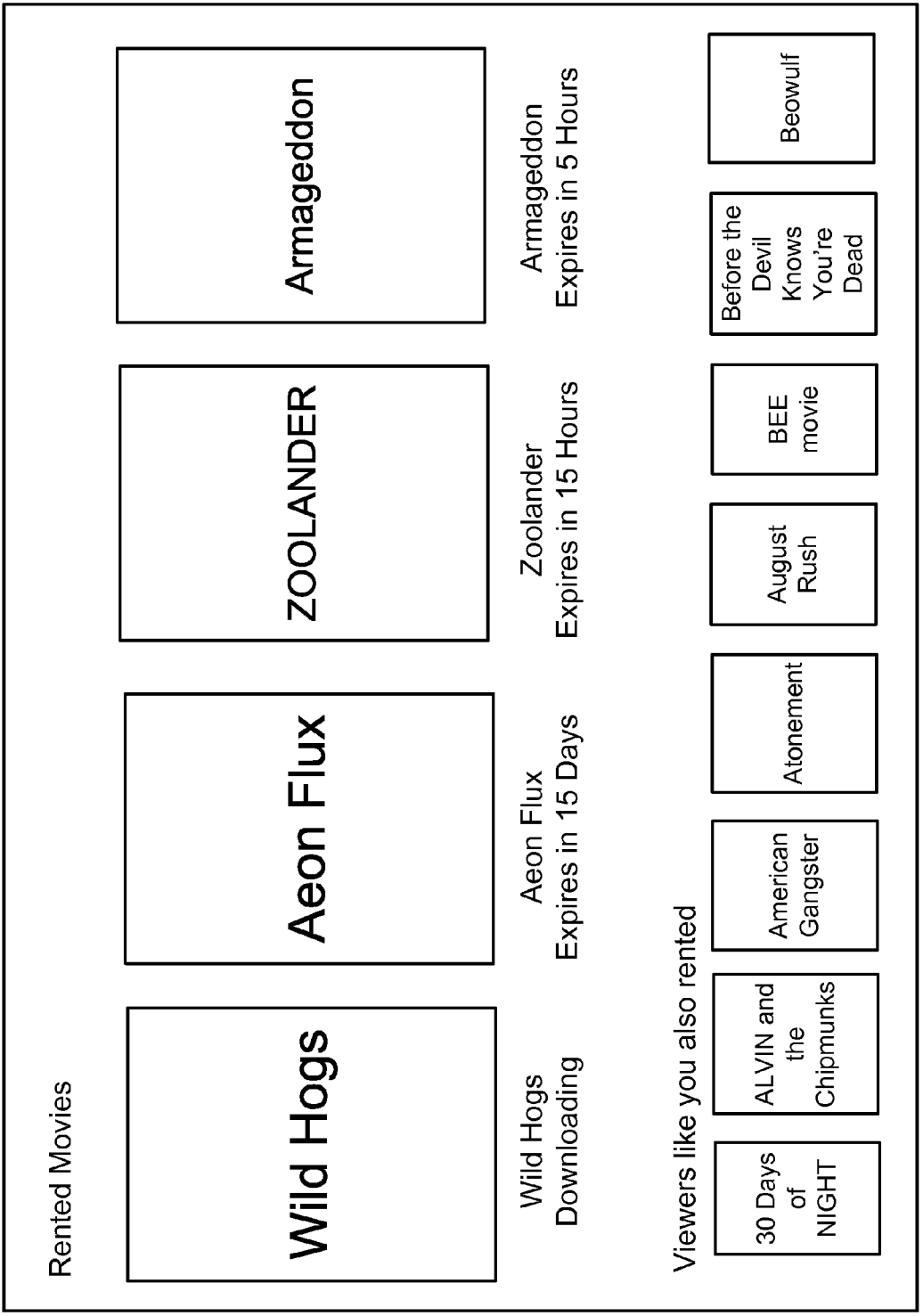
FIG. 8 shows an example GUI screen for displaying a list of rented movies and recommended movies.

FIG. 8 is an example GUI screen 800 that shows a list of rented movies and recommended movies. The GUI screen 800 shows the list of movies rented by the user along with the status of the rented movies. For example, the associated expiration date and/or time can be displayed near the visual indication (e.g., the DVD cover or a screen shot or other images) of each rented movie. For those movies being currently downloaded from a remote location (e.g., iTunes Store), the displayed status can be "downloading." Further, the GUI screen can include visual indications of other movies rented by users with a similar rental history. This can be based on a stored record of movies rented by other users who have rented similar movies as the user.

Figure 9:
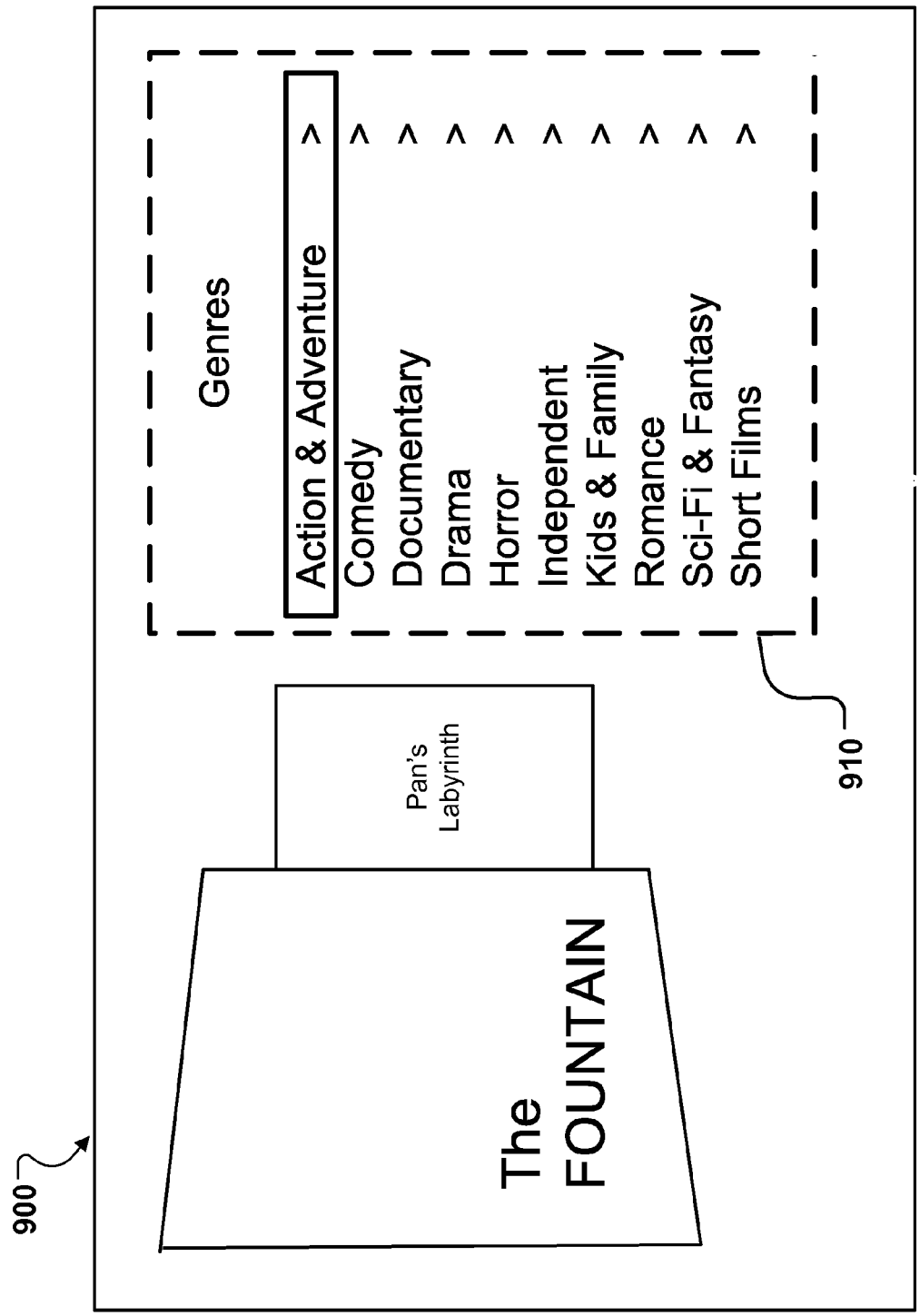
FIG. 9 shows an example GUI screen for providing a choice of genres to a user.

FIG. 9 shows an example GUI screen 900 for providing a choice of movie genres to the user. Under the Movies main menu, the genres submenu can provide example user input fields 910 that include various user selectable GUI elements. The user selectable GUI elements can enable the user to select a desired movie genre such as action & adventure, comedy, documentary, drama, horror, independent, kids & family, romance, sci-fi & fantasy, short films, etc. Along with the listing of user selectable genres, a visual indication of one or more movies for each of the highlighted genres can be displayed.

Figure 10:
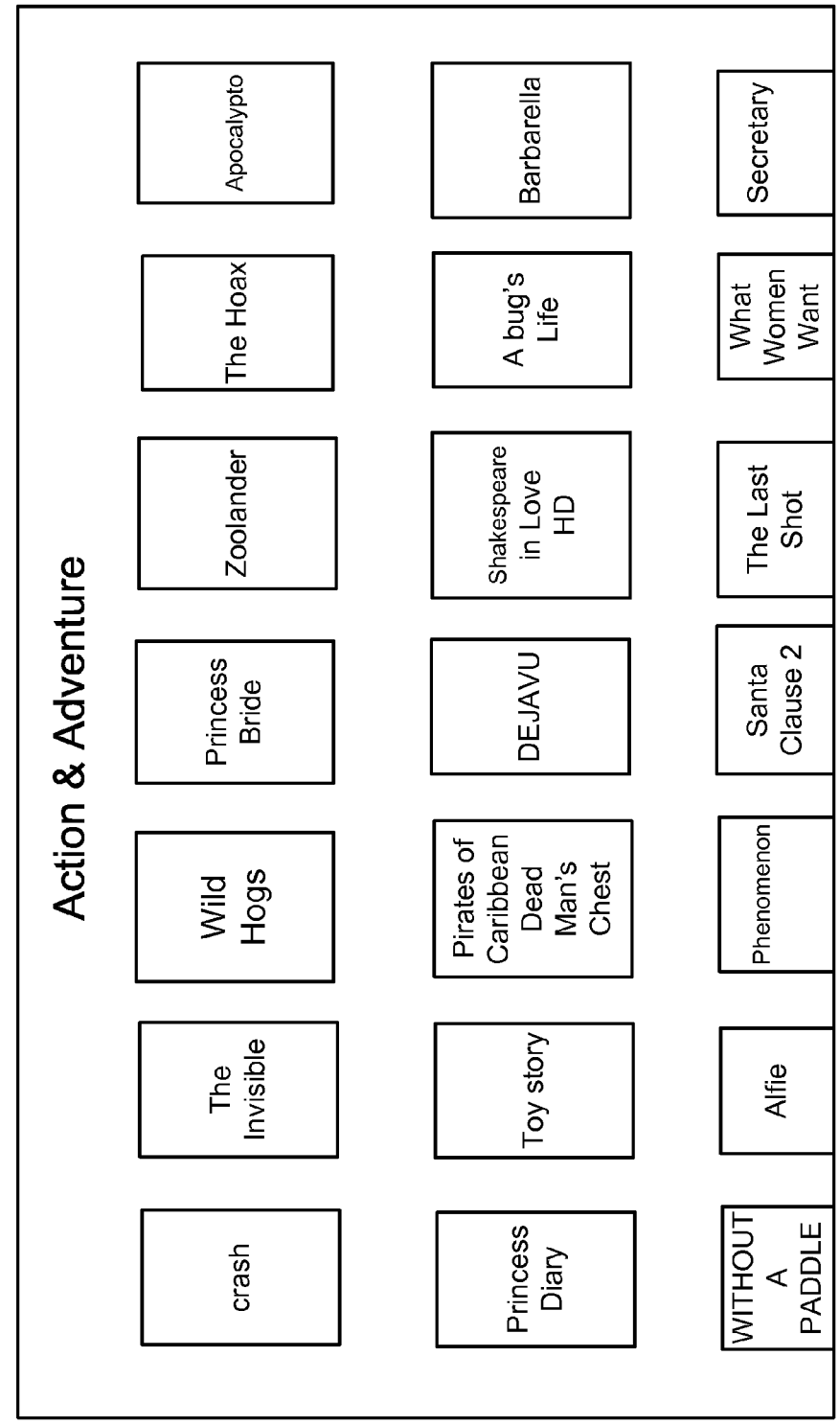
FIG. 10 shows an example GUI screen for a selected movie genre.

FIG. 10 shows an example GUI screen 1000 for a selected movie genre. A list of available movies for the action & adventure genre is shown, for example. Various visual indications representing the movies in the selected genre are displayed. Each of the visual indications can be selected by a user (via a mouse click or a press of button on a remote control device, for example) to display the individual movie information screen.

Figure 11:
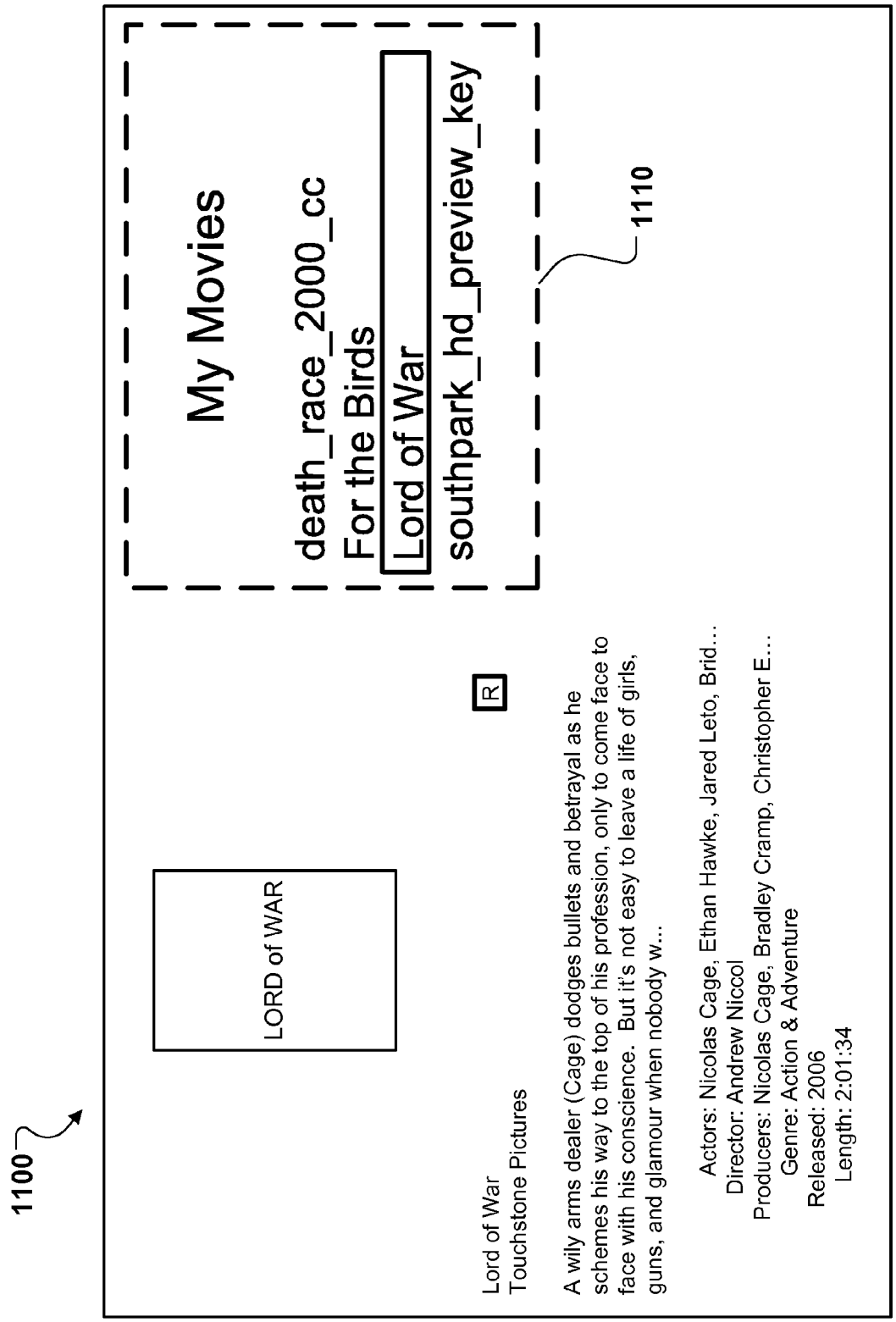
FIG. 11 shows an example GUI screen for displaying movies owned by a user.

FIG. 11 shows an example GUI screen 1100 for displaying the movies owned by the user. An appropriate category listing, such as "My Movies," can be used to indicate that the displayed list of movies are owned and/or rented by the user. This example screen 1100 shows example user input fields 1110 that include a user selectable list of the movies in "My Movies" and a detailed description of each movie. The user selectable list shows a predetermined number of choices (four shown in FIG. 11) shown as a default. To view other movie choices, the user can rotate or scroll through the list using a input device such as a mouse button, keyboard key press or a remote control button press.

Figure 12:
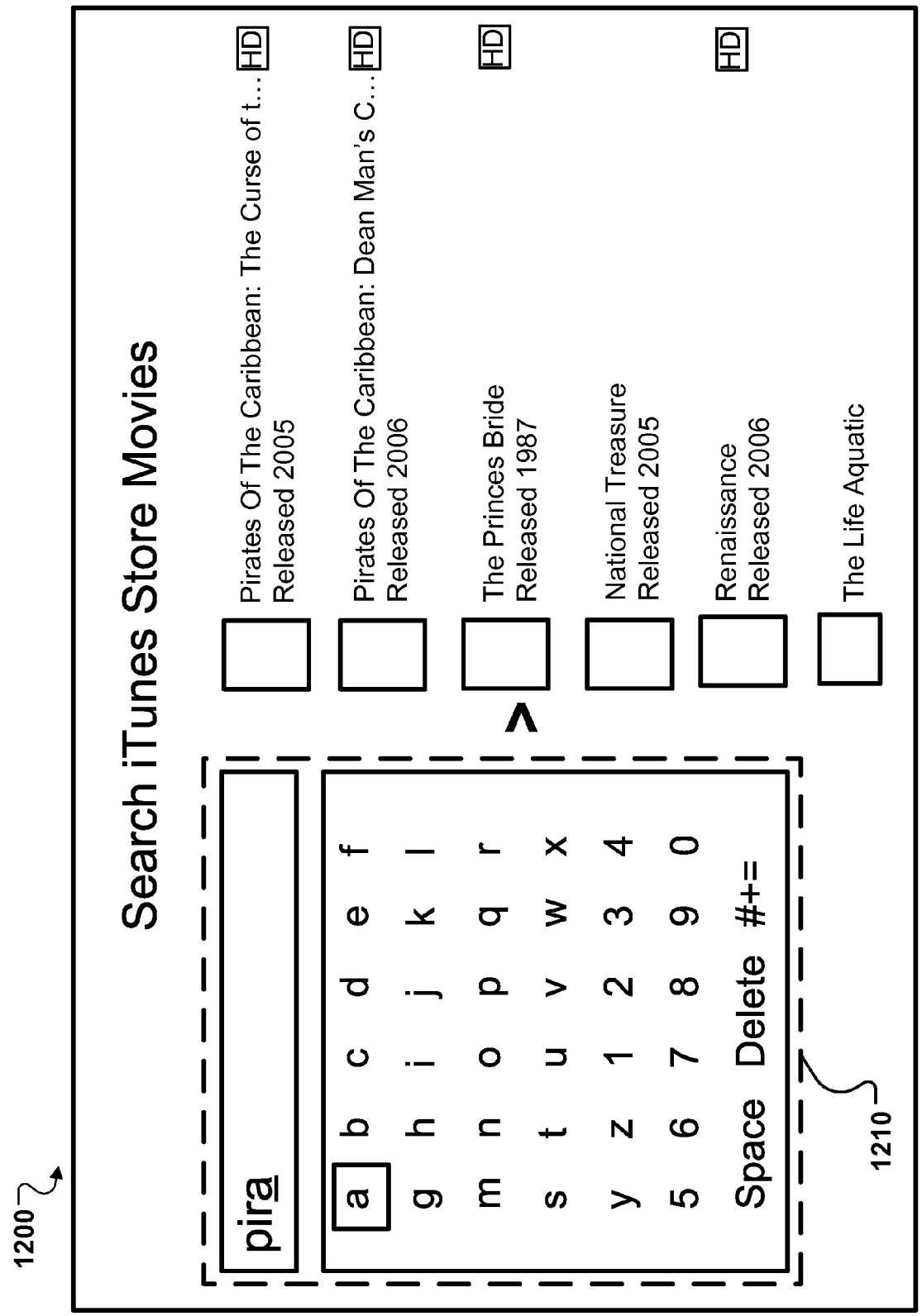
FIG. 12 shows an example GUI screen for displaying example input fields for performing content searches.

FIG. 12 shows an example GUI screen 1200 that displays example input fields 1210 for searching the available content. The input fields 1210 include various user selectable characters and numbers used to input the spelling of a desired movie title. As the user inputs a desired movie title, a list of movies with titles that include one or more of the inputted characters and/or numbers are displayed. In addition, movies with titles that are alphanumerically close to the inputted title can be shown. The listing of the searched movies can be displayed with additional movie information such as a visual indication (e.g., a DVD cover or other related image), title, movie rating, release date, etc.

Figure 13:
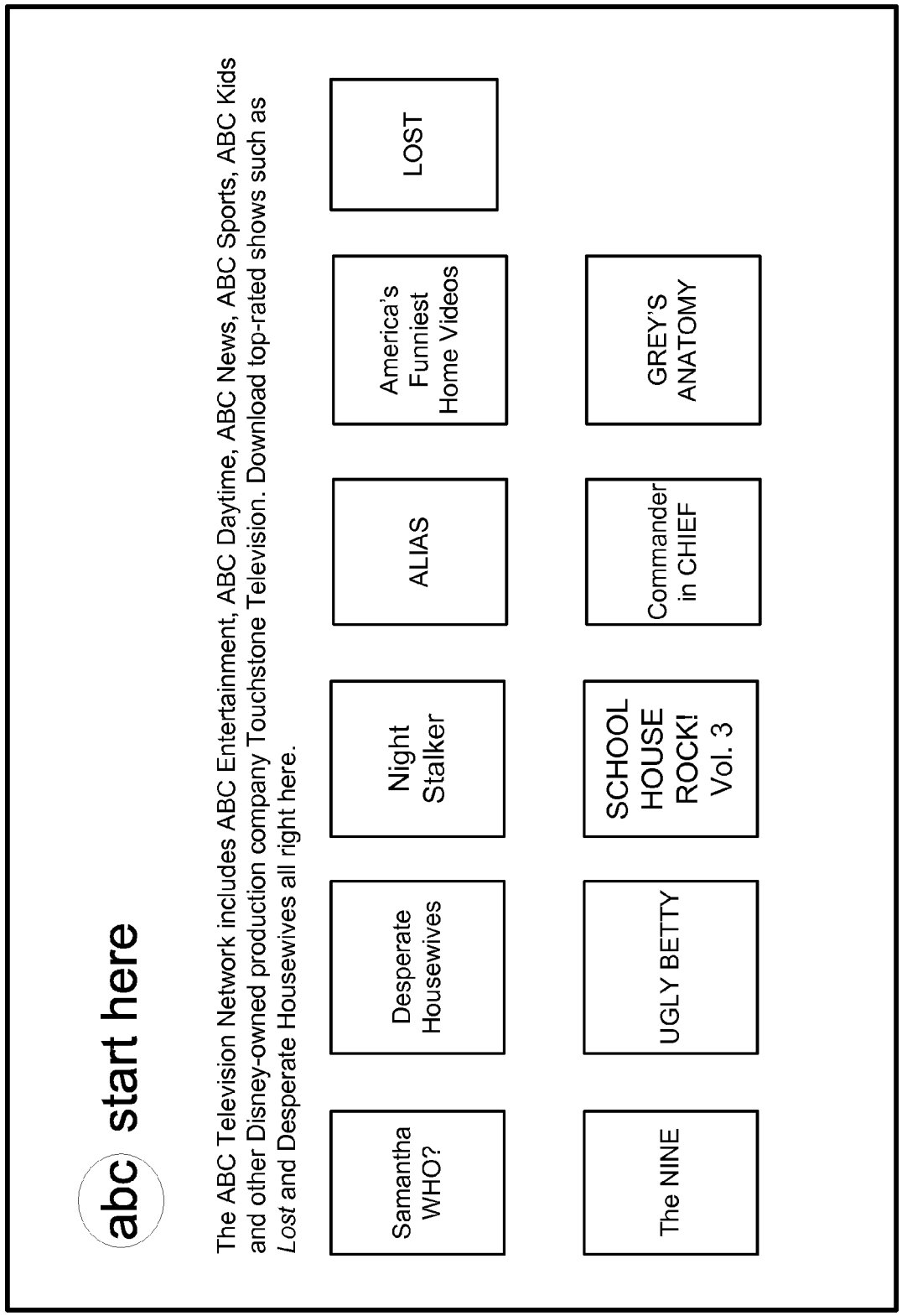
FIG. 13 shows an example GUI screen for displaying available TV shows for a particular TV network.
Figure 14:
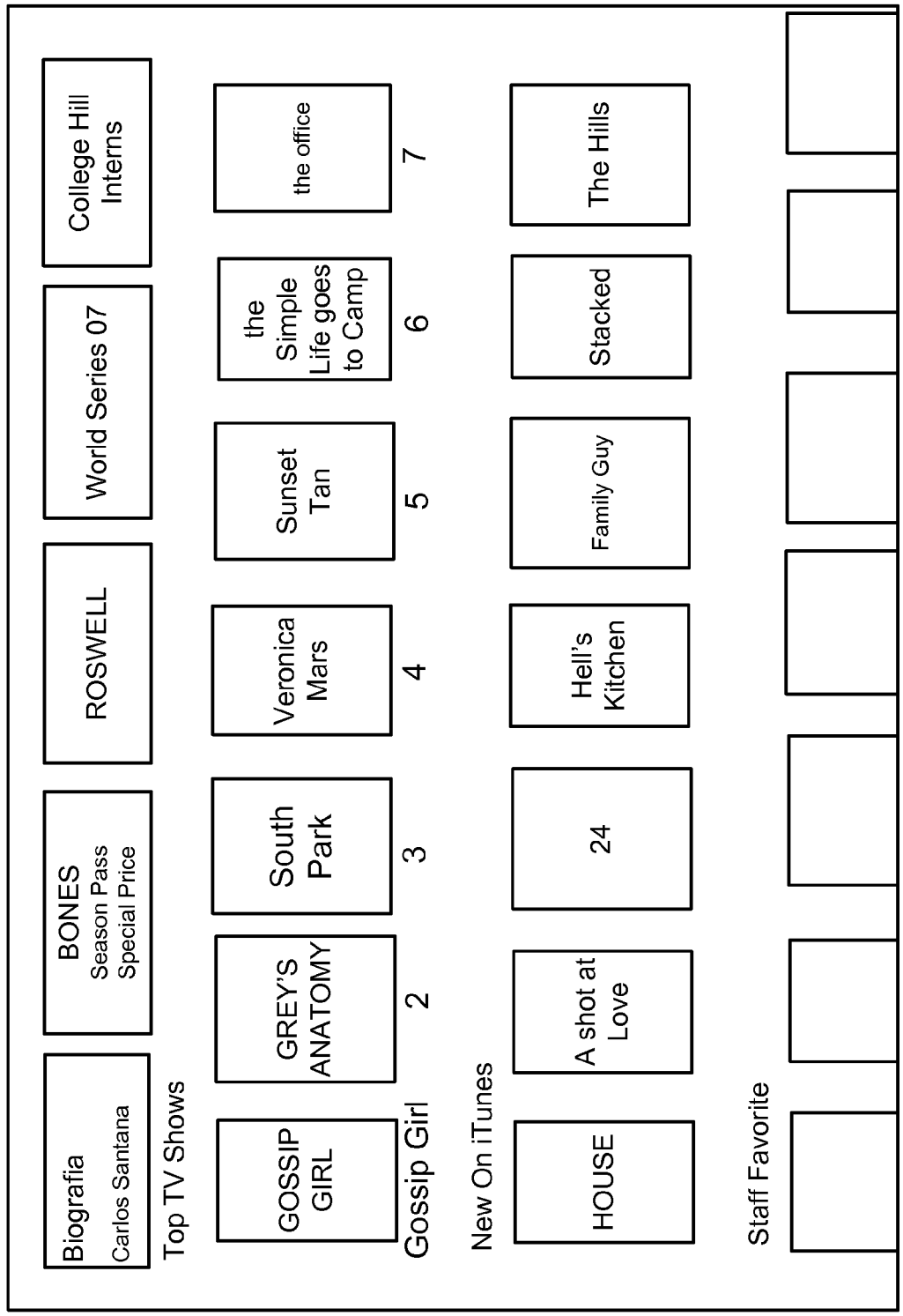
FIG. 14 shows a listing of TV shows organized in rows by different TV show categories.
Figure 15:
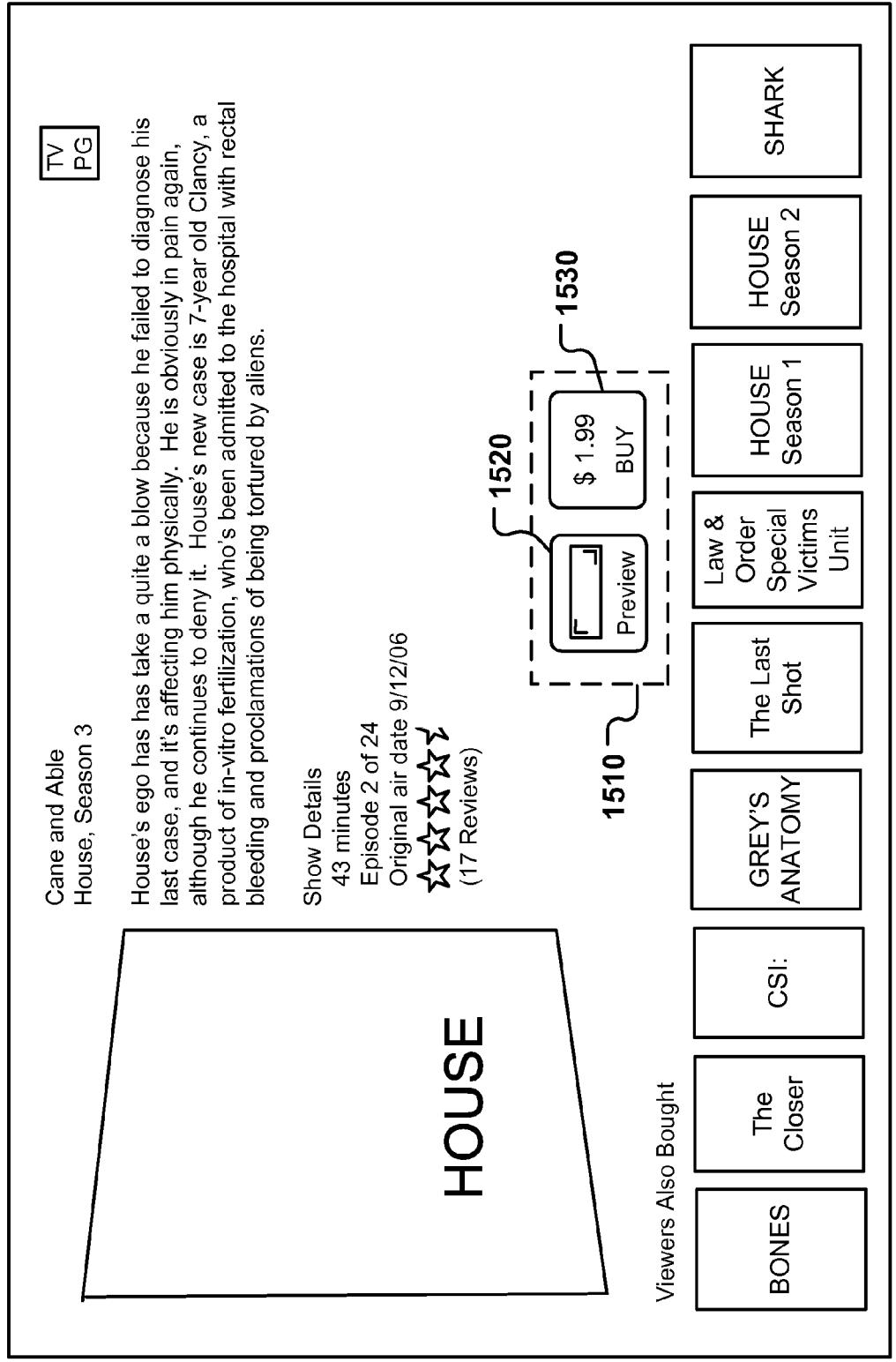
FIG. 15 shows detailed description of a selected TV show.

FIGS. 13, 14 and 15 show example GUI screens for providing TV show choices to the user. FIG. 13 shows an example GUI screen for displaying the available TV shows for a particular TV network. Alternatively, FIG. 14 shows a listing of TV shows organized in rows by different TV show categories. Example TV show categories can include top TV shows, new shows added, staff favorites, etc. available at a remote content or media source 130, 140.

FIG. 15 shows detailed description of a selected TV show. Various information related to the selected TV show can be displayed. Example information includes the title, synopsis of the show, length, ratings, original air date, etc. Example user input fields 1510 can be provided to enable the user to purchase the show or watch the preview by interfacing with GUI elements 1520 and 1530 respectively. Also, additional user input elements can be provided to enable additional interactive experience for the user.

Figure 16:
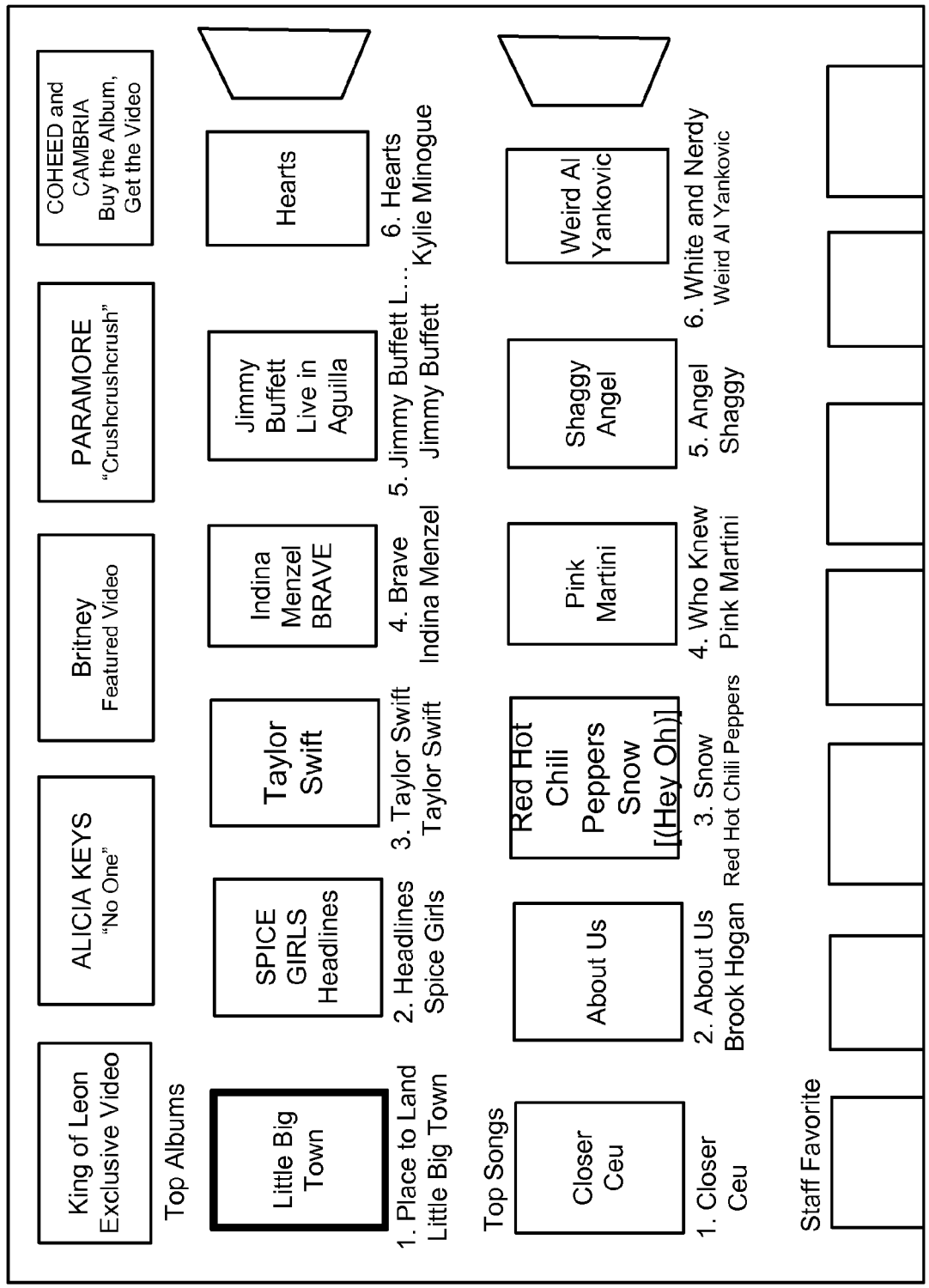
FIG. 16 shows an example GUI screen for displaying available music for purchase organized in rows or columns by various music categories.
Figure 17:
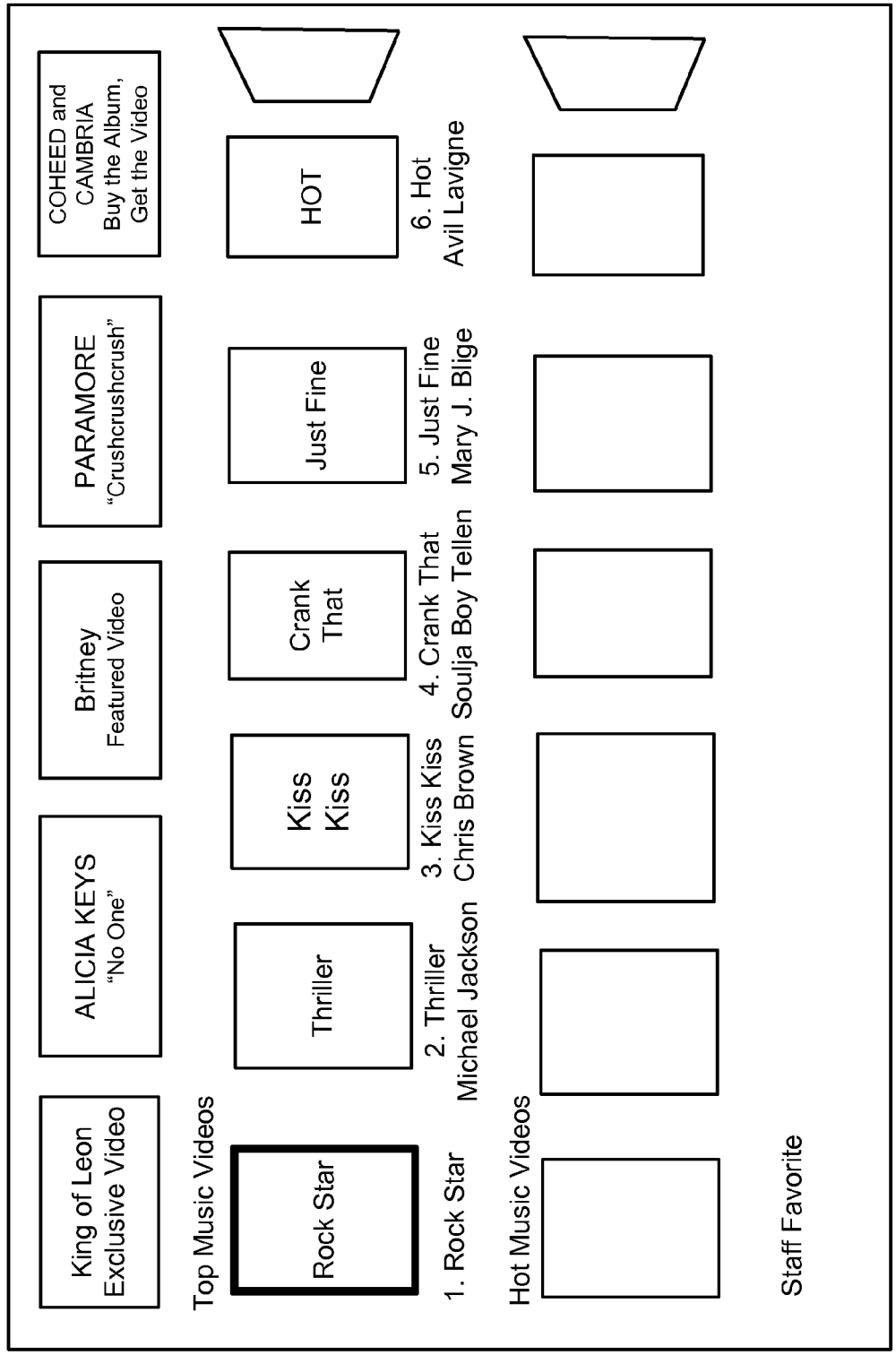
FIG. 17 shows an example GUI screen for displaying available music videos.
Figure 18:
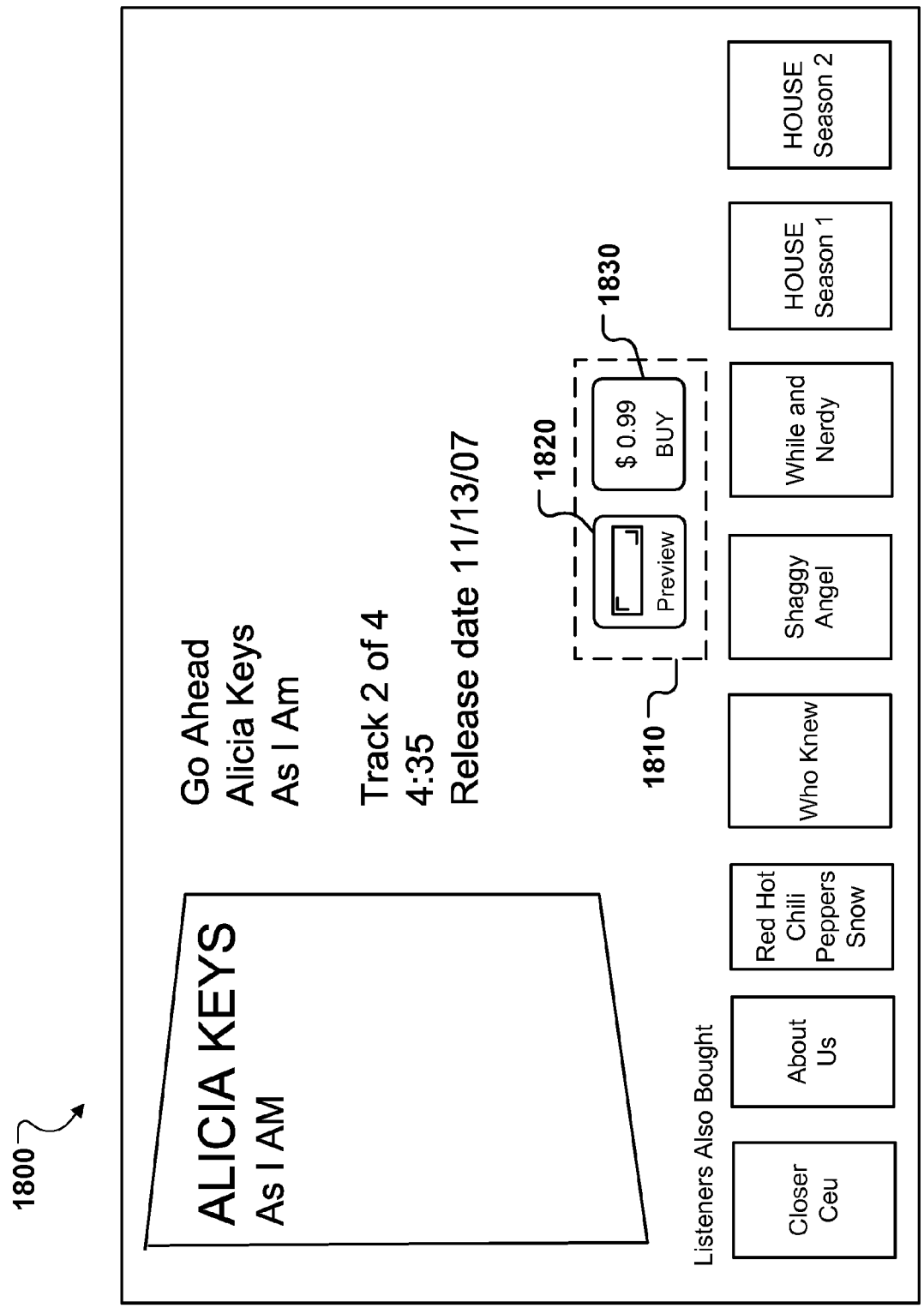
FIG. 18 shows an example GUI screen for displaying detailed information for a selected song or music video.

FIGS. 16, 17 and 18 show example GUI screens for providing music choices to the user. FIG. 16 shows an example GUI screen for displaying the music available for purchase organized in rows or columns by various music categories. Example music categories include top albums, top songs, staff favorites, etc.

FIG. 17 shows an example GUI screen for displaying the available music videos. The music videos can be displayed organized in rows or columns by various music video categories. Example music video categories can include top music videos, hot music videos, staff favorites, etc.

FIG. 18 shows an example GUI screen for displaying detailed information for a selected song or music video. Example information displayed can include a visual indication (CD cover or other images or pictures), title of the song/music video, name of the artist, name of the album, track number, track length, release date, etc. In addition, example user input fields 1810 can be provided to enable the user to watch/listen to a preview or purchase the song/music video by interfacing with the appropriate GUI elements 1820, 1830. In addition, FIG. 18 shows a list of related music. For example, songs or albums or music videos purchased by other listeners who have also purchased the selected song are displayed. This listing of related music can function as a recommendation mechanism.

Figure 19:
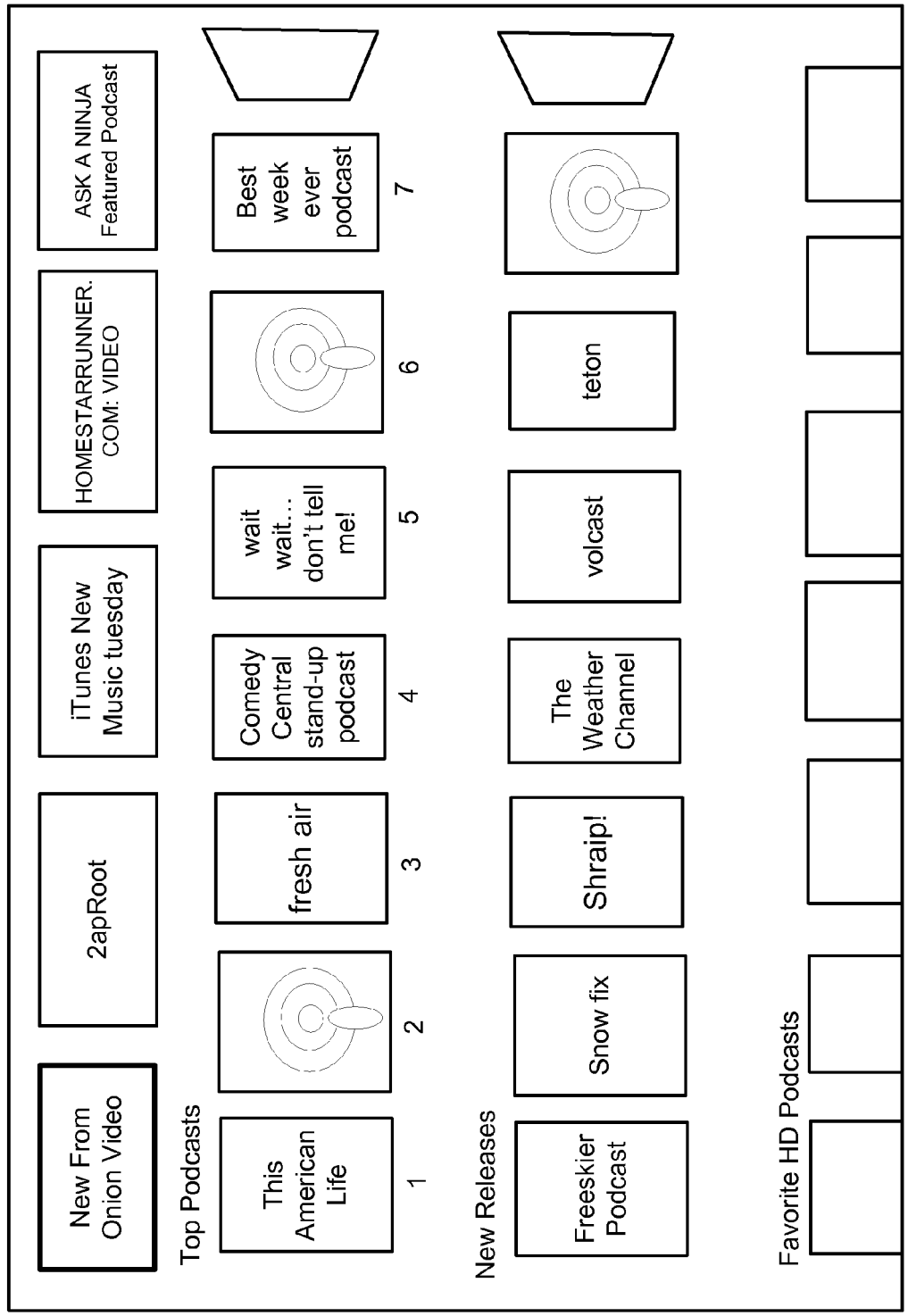
FIG. 19 shows an example GUI screen for displaying available podcasts organized in rows or columns by various podcast categories.
Figure 20:
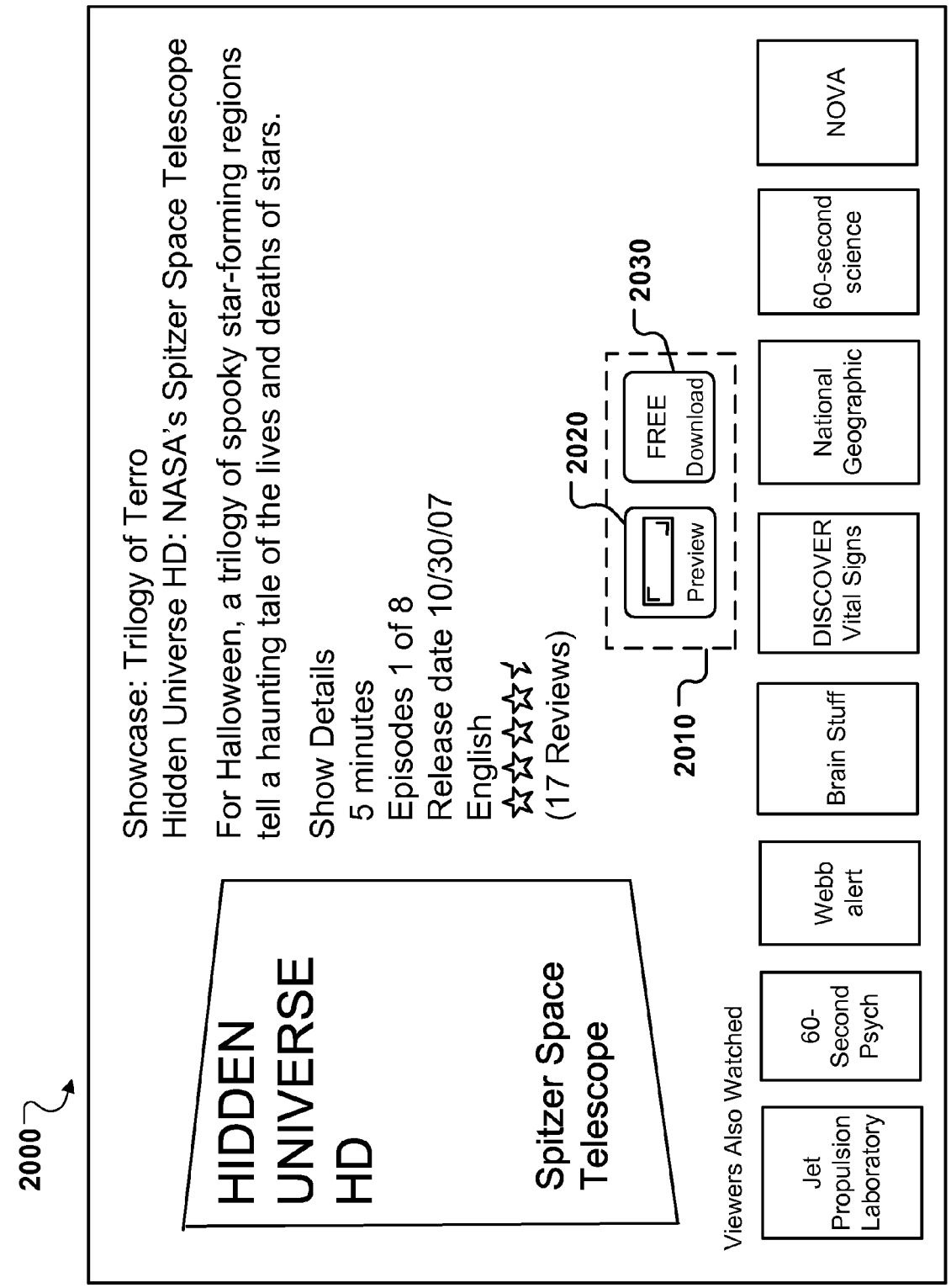
FIG. 20 shows an example GUI screen for displaying a detailed description of a selected podcast.

FIGS. 19 and 20 show example GUI screens for providing choices of podcasts to the user. FIG. 19 shows an example GUI screen for displaying available podcasts organized in rows or columns by various podcast categories. Example podcast categories include Top Podcasts, New Releases, Favorite HD Podcasts, etc.

FIG. 20 shows an example GUI screen 2000 for displaying a detailed description of a selected podcast. The GUI screen 2000 displays the selected podcast by showing a visual indication and various podcast information such as the title, short synopsis, length, episode number, release date, ratings, language, etc. In addition, example user input fields 2010 can be provided to enable user selection and download of the podcast. The user can preview and/or download the podcast by interfacing with the appropriate GUI elements 2020, 2230. Further, a listing of podcasts viewed by other viewers who have also viewed the selected podcast can be shown. This can function as a recommendation mechanism for the user.

FIGS. 21, 22 and 23 are tables 2100, 2200, 2300 showing example organization of the GUI screens as described with respect to FIGS. 2-20. The tables 2100, 2200 and 2300 shown in FIGS. 21, 22 and 23 describe the organization of the GUI screens along with some rules and notes for the GUI environment and operation.

FIGS. 21 and 22 show tables 2100 and 2200 that describe the organization of the GUI screens with respect to Movies and TV Shows main menu items. The tables 2100 and 2200 include columns 2110, 2120, 2130, 2140, 2210, 2220, 2230 and 2240. Columns 2110, 2210 show the main menu items. Columns 2120, 2220 show the submenu items for main menu items shown in columns 2110, 2210. Columns 2130, 2230 show the content descriptions for the submenu items under each menu item. Columns 2140, 2240 show the rules & notes for operation of the main menu and the submenu.

For the main menu item, "Movies," various submenu items are displayed. The submenu items in column 2120 can include: Trailers, Rented, Top Movies, Featured (optional), Genres, Search, My Movies, and Shared Movies. In some implementations, additional submenu items can be included. For the Trailers submenu item, a presentation of the available trailers can be provided (see column 2130). The available trailers can be obtained from various sources (see column 2140.) The presentation can include a list or a grid of images that represent the available trailers.

For the Rented submenu item (column 2120), a presentation of current movies rented by the user can be displayed (see column 2130). One or more visual indications (e.g., images such as movie poster/cover) can be used to represent the rented movies. Alternatively, a textual list can be provide with or without images. For the rented movies, a list of suggested movies based on the rented movies can be provided to the user using a visual indication (see column 2140).

For the Top movies submenu item (column 2120), available movies from content rental source(s) (e.g., websites, such as iTunes store) can be displayed (see column 2130). These Top movies can be organized under different sections, such as New, Featured, Top Ten, etc. The information or signal feed from the content rental sources (e.g., iTunes feed) can determine the content and titles of the sections (see column 2140.)

The Featured submenu item (column 2120) can be used as an optional section to display available Featured movies split off from the Top movies submenu (see column 2130.) The Featured submenu item can be included in the submenu screen if provided for in the feed (see column 2140.)

For the Genres submenu item (column 2120), the available movie genres can be displayed (see column 2130) for user selection. A list of available movie genres can be received from the feed (see column 2140.)

For the Search submenu item (column 2120), no content is provided (see column 2130.) The search submenu item enables the user to search for a desired content available from the content source(s), such as iTunes store (see, column 2140.)

For the My Movies submenu item (column 2120), the user owned or created movies are displayed. For example, user purchased movies and home movies can be displayed (see, column 2130.) The movies are shown for this submenu item when there are user owned content. In addition, content from shared computers or other sources can be included (see, column 2140.)

For the Shared Movies submenu item (column 2120), movies from shared movies library sources, such as shared computers in the local network can be displayed (see column 2130.) Content for this submenu appears when connected to at least one shared movie libraries from at least one shared resources.

For the TV Shows main menu item (column 2110), various submenu items can be included (column 2120.) For example, the submenu items for the TV Show can include Favorites, Top TV Shows, Featured (optional), Genres, TV Networks, Search, My TV Shows, and Shared TV Shows.

For the Favorites submenu item (2120), TV shows that the user downloaded and added to the Favorite category are displayed (see, column 2130.) Folders can be provided for each TV show to include downloaded episodes as well as episodes available from the content sources, such as iTunes stores (see column 2130.) The TV show folders can include all seasons (see, column 2140.) The most recent season can be the first level in the folder with a link to each of the other seasons (see, column 2140.)

For the Top TV Shows submenu item (column 2120), top TV shows available from the content source(s), such as iTunes can be displayed organized under various sections. The Top TV Shows sections can include Featured, Top Episodes, Top Seasons, New, etc. (see column 2130.) The feed from the content source(s) can determine the content and titles for the sections (see, column 2140.)

The Featured submenu item (column 2120) is an optional submenu item. The featured TV shows available from the content source(s) are displayed. This submenu item can be split from the Top TV shows submenu (see column 2130.) The Featured submenu item can be included in the submenu screen if provided for in the feed (see column 2140.)

For the Genres submenu item (column 2120), the available TV show genres can be displayed for user selection (see column 2130). A list of available TV genres can be received from the feed (see column 2140.)

For the TV Networks submenu item (column 2120), a list of the available TV networks can be displayed (column 2130.) The list of available TV networks is provided by the feed (column 2140.)

For the Search submenu item (column 2120), no content is provided (see column 2130.) The search submenu item enables the user to search for a desired content available from the content source(s), such as iTunes store (see, column 2140.)

For the My TV Shows submenu item (column 2120), the user owned and/or watched TV Shows are displayed. For example, user purchased and/or watched TV Shows can be displayed (see, column 2130.) Folders for the TV shows can be added when the user purchases an episode from the content source(s) ir syncs with library of TV shows from the content source(s). In addition, content from shared computers or other sources can be included (see, column 2140.)

For the Shared TV Shows submenu item (column 2220), TV shows from shared content library sources, such as shared computers in the local network can be displayed (see column 2230.) Content for this submenu appears when connected to at least one shared content libraries from at least one shared resources (see column 2240.)

FIGS. 22 and 23 also show tables 2200 and 2300 that describe the organization of the GUI screens with respect to Music and Podcasts. The tables 2200 and 2300 include columns 2210, 2220, 2230, 2240, 2310, 2320, 2330 and 2340. Columns 2210, 2310 show the main menu items. Columns 2220, 2320 show the submenu items for main menu items shown in columns 2210, 2310. Columns 2230, 2330 show the content descriptions for the submenu items under each menu item. Columns 2240, 2340 show the rules & notes for operation of the main menu and the submenu.

For the Music main menu item (column 2210), various submenu items can be displayed (column 2220.) For example, the submenu items for Music can include Now Playing, Top Music, Featured (optional), Genres, New Release, Search, My Music, and Shared Music.

For the Now Playing submenu item (2220), the user is taken directly into the now playing screen (see, column 2230.) This submenu appears when music is playing or paused (see, column 2240.)

For the Top Music submenu item (column 2220), top music available from the content source(s), such as itunes, can be displayed organized under various sections. The Top Music sections can include Featured, Top Songs, Top Albums, etc. (see column 2230.) The feed from the content source(s) can determine the content and titles for the sections (see, column 2240.)

The Featured submenu item (column 2220) is an optional submenu item. The featured music available from the content source(s) can be displayed under this submenu item. The Featured submenu item can be split from the Top Music submenu (see column 2230.) The Featured submenu item can be included in the submenu screen if provided for in the feed (see column 2240.)

The Music Video submenu item (column 2220) can be the main display screen for the music video (column 2230.) The signal feed can determine the content and the titles in this submenu item (see, column 2240.)

For the Genres submenu item (column 2220), the available music genres can be displayed (see column 2230) for user selection. A list of available music genres can be received from the feed (see column 2240.)

For the New Releases submenu item (column 2220), a list of the available newly released music can be displayed (column 2230.) The newly released music can be displayed as a list or grid using visual indications. Alternatively, the available newly released music can be displayed using categories or sections such as "This Week", "Last Week", or "Genres." The list of available music is provided by the feed (column 2240.) In addition, deeper levels can be provided for user navigation.

For the Search submenu item (column 2220), no content is provided (see column 2230.) The search submenu item enables the user to search for a desired content available from the content source(s), such as iTunes store (see, column 2240.)

For the My Music submenu item (column 2220), the user owned music can be displayed under various categories including "Now Playing", "Shuffle Songs", "Albums", "Play Lists", "Music Videos", etc. For example, user purchased music can be displayed (see, column 2230.) In addition, music available from synced music library can be displayed. In addition, content from shared computers or other sources can be included (see, column 2240.)

For the Shared Music submenu item (column 2220), Music from shared content library sources, such as shared computers in the local network can be displayed (see column 2230.) Content for this submenu appears when connected to at least one shared content library from at least one shared resource (column 2240.)

For the Podcasts main menu item (column 2210), various submenu items can be included (column 2220.) For example, the submenu items for Podcasts can include Favorites, Top Podcasts, Featured (optional), Genres, Providers, Search, My Podcasts, and Shared :Podcasts.

The Favorites submenu item (2220) is similar to the Favorite TV Shows (see, column 2230.) Podcasts that the user downloaded and added to the Favorite category are displayed. Folders can be provided for each podcast to include downloaded podcasts as well as podcasts available from the content sources, such as various podcast producers. The podcasts folders can include all seasons. The most recent season can be the first level in the folder with a link to each of the other seasons.

For the Top Podcast submenu item (column 2220), top podcasts available from the content source(s), such as iTunes or other podcast producers can be displayed organized under various sections. The Top Podcast sections can include New, Featured, Top Podcasts, The News, etc. (see column 2230.) The feed from the content source(s) can determine the content and titles for the sections (see, column 2240.)

The Featured submenu item (column 2220) is an optional submenu item. The featured podcasts available from the content source(s) are displayed. This submenu item can be split from the Top Podcasts submenu (see column 2230.) The Featured submenu item can be included in the submenu screen if provided for in the feed (see column 2240.)

For the Genres submenu item (column 2220), the available podcast genres can be displayed (see column 2230) for user selection. A list of available podcast genres can be received from the feed (see column 2240.)

The Providers submenu item (column 2220) can display a list of featured podcast providers (column 2230.) The signal feed can determine the content and the titles in this submenu item (see, column 2240.)

For the Search submenu item (column 2220), no content is provided (see column 2230.) The search submenu item enables the user to search for a desired content available from the content source(s), such as iTunes store (see, column 2240.)

For the My Podcast submenu item (column 2220), the user subscribed or synced podcasts are displayed (column 2230.) The podcasts in this submenu can be displayed under various categories including "Genres", "News", "Comedy", "Radio Shows", etc. In addition, podcasts available from synced podcast libraries can be displayed. In addition, content from shared computers or other sources can be included (see, column 2240.)

For the Shared Podcast submenu item (column 2320), podcasts from shared content library sources, such as shared computers in the local network can be displayed (see column 2330.) Content for this submenu appears when connected to at least one shared content library from at least one shared resource (see column 2340.)

Table 2300 of FIG. 23 also describes the organization of the GUI screens with respect to Photos, Third-Party Created Content (e.g., YouTube), and Settings. For the Photos menu item (column 2310), various submenu items can be included (column 2320.) For example, the submenu items for Photos can include My Photos, .mac, flickr, Settings, Shared Photos, etc.

For the My Photos submenu item (column 2320), the user owned photos are displayed. Also, content from shared computers or other sources can be included (see, column 2340.)

The Settings submenu item (column 2320) can include details for slideshow settings (see, column 2330.) The details for slideshow settings can include, slideshow background, timing, music accompaniment, graphics, photo editing, etc.

For the Shared Photos submenu item (column 2320), photos from shared content library sources, such as shared computers in the local network can be displayed (see column 2330.) Content for this submenu appears when connected to at least one shared content libraries from at least one shared resources.

For the YouTube main menu item (column 2310), various submenu items can be included (column 2320.) For example, the submenu items for YouTube can include Featured, Most Viewed, Most Recent, Top Rated, History, Search, and Log-In for account name.

The Featured submenu item (2320) can bring up the current featured video list from YouTube website (see, column 2330.) The list of featured videos can be organized in various categories or genres, such as comedy, music, etc.

For the Most Viewed submenu item (column 2320), a list of most viewed YouTube videos can be provided. The list of most viewed videos can be further organized in various categories or genres, such as comedy, music, etc.

For the Most Recent submenu item (column 2320), a list of most recently added YouTube videos can be provided. The list of most recent videos can be further organized in various categories or genres, such as comedy, music, etc.

For the Top Rated submenu item (column 2320), a list of top rated videos can be provided. The list of top videos can be further organized in various categories or genres, such as comedy, music, etc.

For the History submenu item (column 2320), a history for when not logged-in can be displayed. When logged-in, the history can be displayed under "Account Name Section (see column 2340.)

For the Search submenu item (column 2120), no content is provided (see column 2130.) The search submenu item enables the user to search for a desired content available from the content source(s), such as YouTube (see, column 2140.)

For the Log-In or Account Name submenu item (column 2320), the user is provide with a log-in screen if not already logged-in (column 2330.) When the user is not yet logged-in, the account screen is displayed. The account screen can include various categories or folders including "Favorites", "Subscriptions", "History", and "Log Out."

For the Settings main menu item (column 2310), various submenu items can be displayed. The submenu items for the Settings main menu can include General, Screen Saver, Audio, Video, Computers, Downloads, etc.

For example, under the General submenu item (column 2320), information and/or settings are provided for associated network, about the GUI system, content source(s) such as iTunes Store, parental controls, pair remote, update software, language, legal, reset settings, etc. (see column 2330.) For the Screen Saver submenu item (column 2320), the settings for operating screen savers are displayed (column 2330.) For the Audio submenu item (column 2320), various setting are provided such as repeat music, sound check, sound effects, Dolby digital out, over the air (wireless) broadcast such as AirTunes, etc. (column 2330.)

For the Video submenu item (column 2320), various setting can be provided including closed captioning, TV resolution, HDMI output, etc. (see column 2330.) For the Computers submenu item (column 2320), various settings such as connections for syncing and sharing can be displayed (see column 2330.) For the Downloads submenu item (column 2320), various setting can be provided including list of current downloading content with status and priority (see column 2330.)

Figure 24:
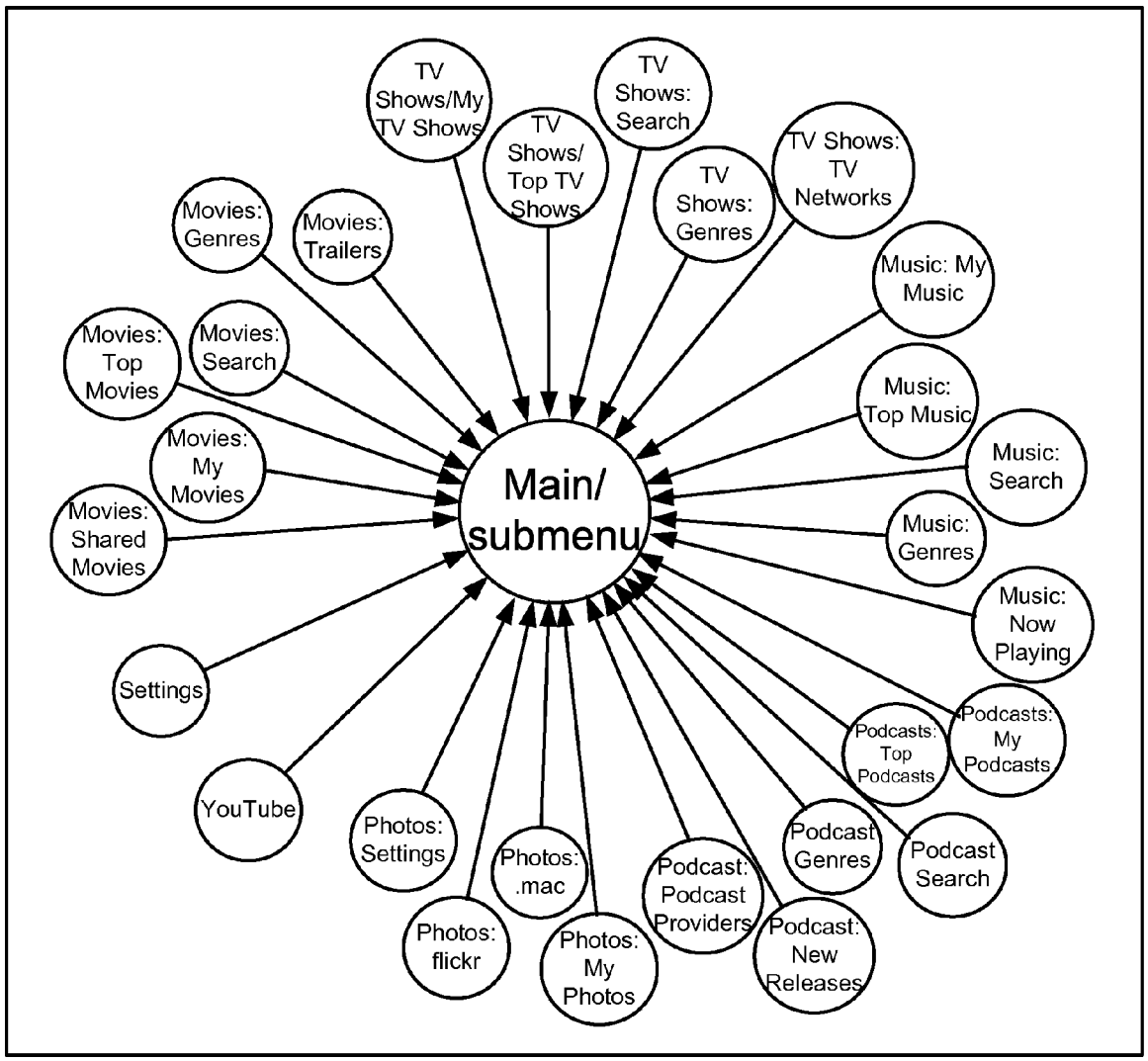
FIG. 24 shows an example organization of different tiers or levels of a menu system in a GUI.

FIG. 24 shows an example organization of the different tiers or levels of the menu system of the GUI described with respect to FIGS. 2-20. The center circle represents the main menu and the outer circles represent the various submenus. These submenus can be directly linked to the main menu. In other words, pressing MENU from any of the outer circles can bring up the main/submenu choices.

The GUI as described in this specification can also include various "My Content" Sections for each content type or category. Example "My Content" sections can include My Movies, My TV Shows, My Music, My Podcasts and My Photos used to organize and display the various content or media owned by the user.

If the user has set up connections for sharing with one or more iTunes libraries in addition to the synced iTunes library, a "Shared" item will appear under Movies, TV Shows, Music, Podcasts and Photos. Each area will have sections such as Shared Movies, Shared TV Shows, etc.

If there is only one shared library connection, going into a Shared section will show the content from that library. If there are two or more shared library connections, going into the Shared section will show the list of libraries, and then choosing a library will show the content from that library.

Figure 25:
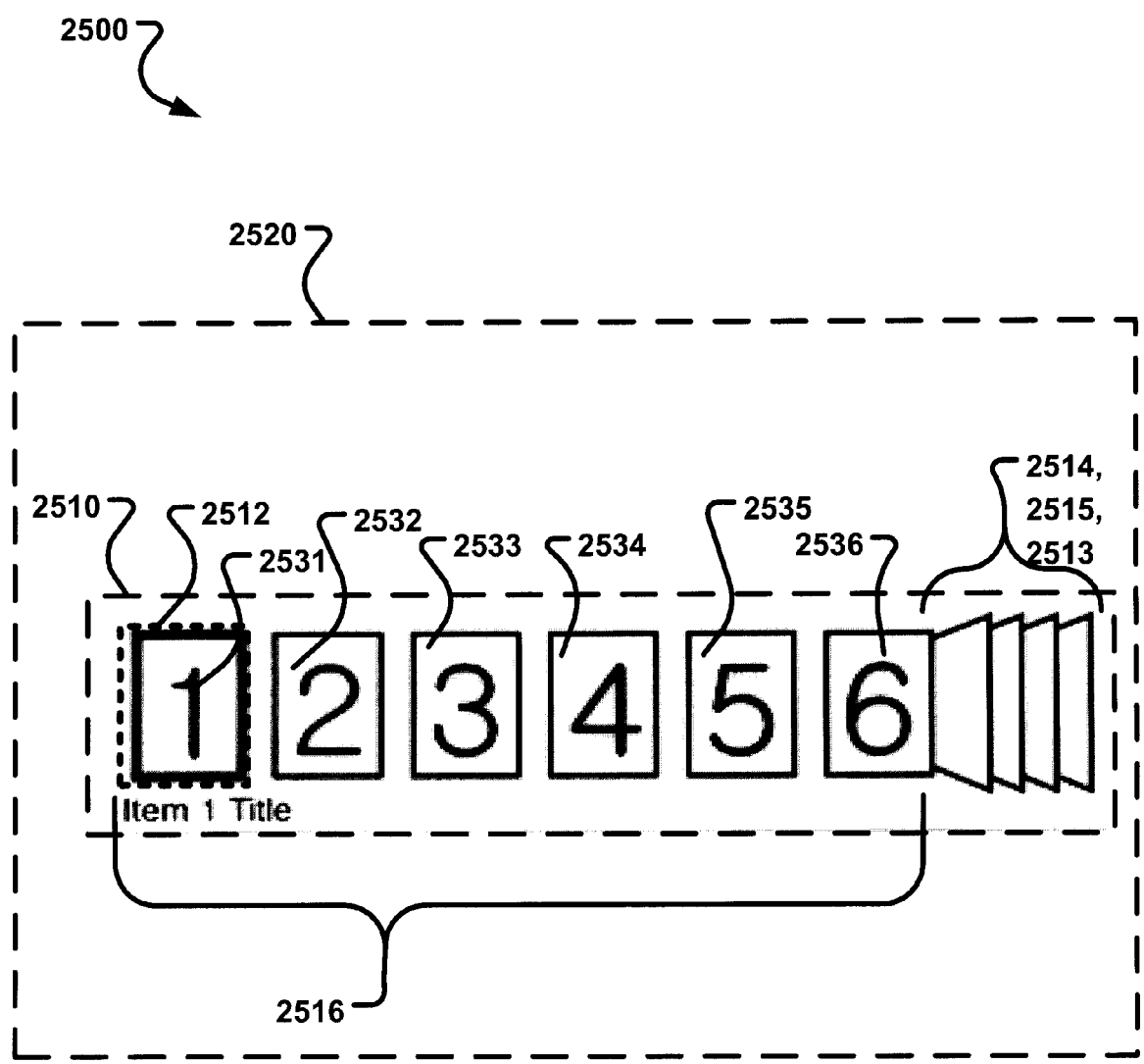
FIG. 25 shows an example schematic of a shelf in its starting state.
Figure 26:
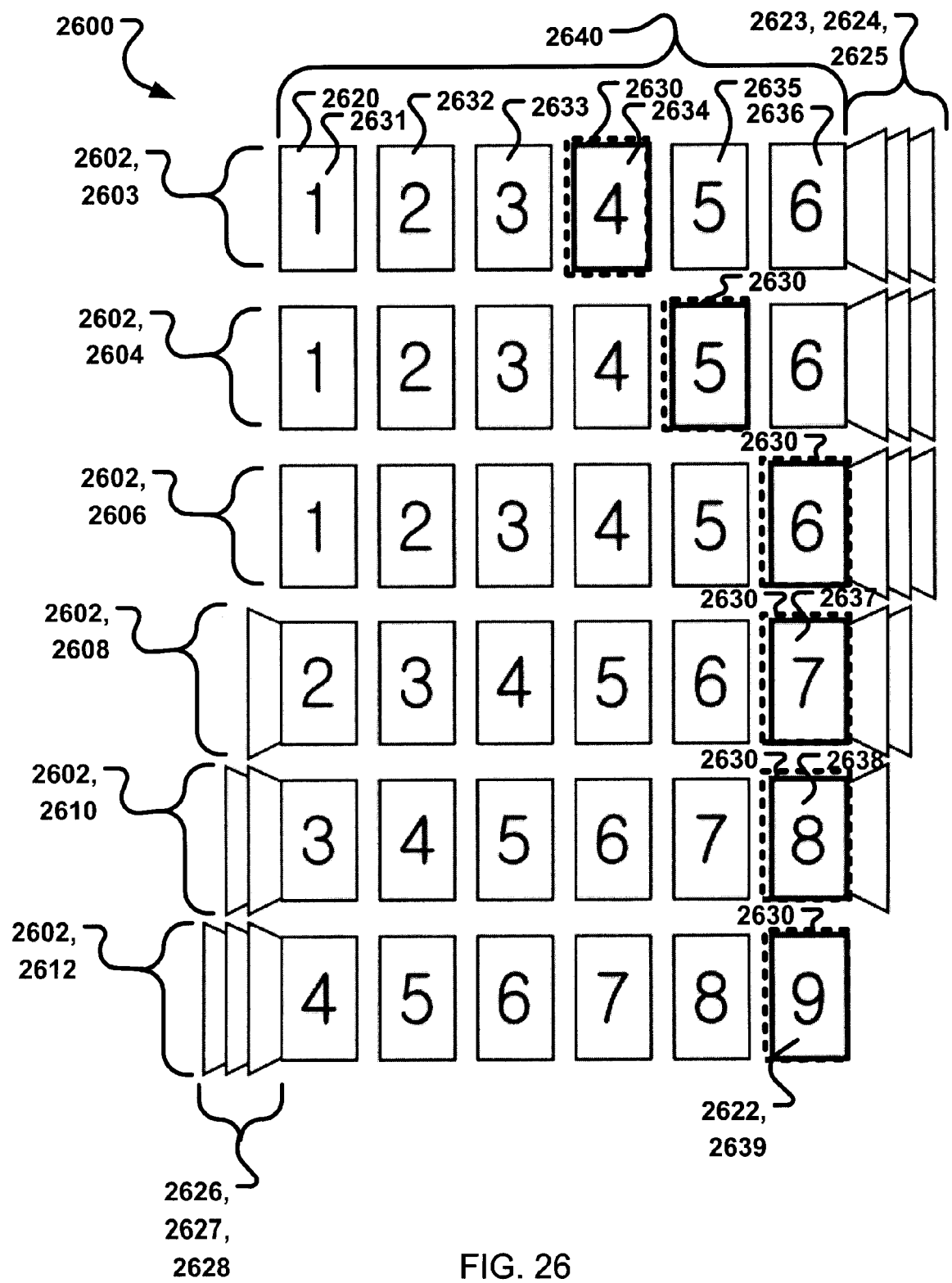
FIG. 26 shows an example navigation of the shelves.

FIGS. 25 and 26 illustrate example GUI elements for displaying a presentation 2500, 2600 of available content or media. The presentation 2500, 2600 of available content or media are organized in rows or shelves 2510, 2602. The rows or shelves 2510, 2602 can be displayed horizontally as shown. Alternatively, the rows or shelves 2510, 2602 can be displayed vertically. The shelves 2510, 2602 include GUI elements or visual indications (e.g., images such as posters/covers) 2531, 2532, 2533, 2534, 2535, 2536, 2531, 2632, 2633, 2634, 2635, 2636 of the available content or media. The visual indications 2531, 2532, 2533, 2534, 2535, 2536, 2631, 2632, 2633, 2634, 2635, 2636 of the one or more available content or media are arranged in rows 2510, 2602 with some coverflow (each image that tilt and overlap) action at the right edge 2514, 2624 of the rows 2520, 2602 in the first or starting state and at the left edge 2626 of the rows 2510, 2602 in the second or ending state. The starting state indicates the state of the shelves with the first visual indication 2531, 2631 (i.e., first image) of the first one or first set of available content or media positioned at the leftmost position 2512, 2620 of the row 2510, 2602. The ending state indicates the end of the available content or media for the rows 2510, 2602. The visual indication 2639 of the last available content or media for the row 2602 is positioned at the rightmost position 2622 of the row.

FIG. 25 shows an example presentation 2500 of a shelf 2510 in its starting state. The presentation 2500 includes a display area 2520 that includes a user-selectable area 2516 and a holding area 2515. The user-selectable area 2516 includes one or more user-selectable visual indications 2531, 2532, 2533, 2534, 2535, 2536 arranged in the row 2510 in a non-overlapping manner. The holding area 2513 includes a visual indication item 2515 at the right edge 2514 of the shelf 2510. The visual indication item 2515 is arranged in an overlapping and/or tilted manner in the row 2510. The row 2510 can include any number of available content or media represented by visual indications 2531, 2532, 2533, 2534, 2535, 2536 and 2515. Thus, the shelf 2510 is not limited to the number of visual indication items 2531, 2532, 2533, 2534, 2535, 2536 that can displayed on the shelf 2510. The overlapping visual indication item 2515 at the right edge 2514 represents additional available content or media items that can be presented to the user to be selected. In response to user input, the non-selectable visual indication 2513 can be changed to user-selectable visual indication that moves into the user-selectable area 2516 of the display area 2520.

FIG. 26 shows an example navigation of the shelves. A step-by-step process of navigating through the presentation 2600 of available content or media organized in rows or shelves 2602 is shown. The presentation 2600 includes one or more rows or shelves 2602. Each row 2602 includes a user-selectable area 2640 and one or more holding areas 2623, 2627. The user-selectable area 2640 is designed to display at least one visual indication 2631, 2632, 2633, 2634, 2635, 2636 that represents one or more of the available content items. The one or more holding areas 2623, 2627 are designed to display another visual indication 2625 that represents other available content items not displayed in the user selectable area 2640.

In response to user input, highlighting 2630 is positioned over a visual indication (e.g., 2634) of a selected available content or media in the shelf 2602. In response to another user input, (e.g., when user presses "right" via a remote control button) the highlighting 2630 is moved across the visual indications 2631, 2632, 2633, 2634, 2635, 2636, 2637, 2638, 2639 of the available content or media in the shelf 2602. FIG. 26 shows various states 2603, 2604, 2606, 2608, 2610 and 2612 of the shelf 2602 as the highlighting 2630 moves across the visual indications 2631, 2632, 2633, 2634, 2635, 2636, 2637, 2638, 2639. Initially, the highlighting 2630 is positioned over visual indication item 4 (2634) in response to user input. In response to additional user input, the highlighting 2630 can continue to move to the right or left until the last non-overlapping user-selectable visual indication item 2636 (item 6 in FIG. 26) is reached. At that point, the tilted or overlapping non-selectable visual indication 2625 on the right edge 2624, start to flatten out (i.e., changes) with further user input, and the visual indication items 2631, 2632, 2633 on the left move to the left edge 2626, change or rearrange (e.g., tilt), and become non-selectable, overlapped visual indication items 2628, as shown in states 26006, 2608 and 2610 of the shelf 2602 in FIG. 26.

FIG. 27 is a table 2700 showing example remote control events for the shelves. The table 2700 includes a first column 2710 and a second column 2720. The first column 2710 describes the remote control events in response to user input. The second column 2720 describes the resultant GUI reaction in response to the remote control event. For example, when the "Up (+)" button on the remote control input device 160 is actuated by the user (user input), highlighting is moved to nearest user-selectable item above. Or no operation is performed when already at the top of the user-selectable items. When the "Up (+)" button is actuated by user input and held in place, the highlighting is continuously moved until the top is reached. Alternatively, when "Down (−)" button is actuated by user input, the highlighting is moved to the nearest user-selectable item below. Or no operation is performed when already at the bottom of the user-selectable items. When the "Down (−)" button is actuated by user input and held in place, the highlighting is continuously moved until the bottom is reached.

When the "Left (|<<)" button is actuated by user input, the highlighting is moved to the nearest left user-selectable item. If the user is already at the left edge of the user-selectable area, the highlighting is moved to the submenu that corresponds to the user-selectable area displayed. The submenu item selected may not be the nearest submenu item. If there are tilted, overlapping visual indications to the left of the highlighted item, pressing "Left (|<<)" can "flatten out" or change the overlapping visual indications to non-overlapping user-selectable visual indication items and highlight the nearest changed user-selectable item on the left. When the "Left (|<<)" button is actuated by user input and held in place, the highlighting is continuously moved left. When present, the tilted overlapping visual indications are "flattened out" and the highlighting moves over the "flattened out" visual indications until the leftmost visual indication item (e.g., item 1 in FIG. 26) is reached.

When the "Right (|>>)" button is actuated by user input, the highlighting is moved right. As necessary, any tilted overlapping visual indication items are "flattened out" and highlighted. Also, as necessary, when the overlapping visual indication items are "flattened out," the non-overlapping visual indication items on the left edge are changed or "tilted" to non-selectable visual indications arranged in overlapping manner. When the "Right (|>>)" button is actuated by user input and held in place, the highlighting is continuously moved to the right until the rightmost visual indication item is reached. As the highlighting is moved to the right, any tilted overlapping visual indications on the right edge are "flatted out" as necessary.

When the "Play/Pause/Select (>||)" button is actuated by user input, a new screen associated with the selected visual indication item is displayed. For example, a screen 700 that shows the movie details (e.g., FIG. 7) can be displayed when a visual indication that represents a movie is selected. When the "Play/Pause/Select (>||)" button is actuated by user input and held in place, various operations can be performed. For example, no operation can be performed. Alternatively, the user can be put in a Standby mode.

When the "Menu" button is actuated by user input, the submenu screen can be displayed to the user. When the "Menu" button is actuated by the user input and held in place, the main menu can be displayed.

By navigating through the available content or media organized as multiple shelves on the same screen, the shelves can end up in a few different states. Example shelf states can include original state, with tilted items at right edge; tilted items on both edges; and tilted items on the left edge.

Moving up and down in the content or media area can preserve the shelf states. However, leaving that content or media area by going to a different content or media area can reset all the shelves to their original position.

For example, when the user moves from browsing around in Top Movies category to the Search section, the state of the selves are reset. This enables the user to return to Top Movies, with the shelves reset to their original state.

In some implementations, a timer and the state of the shelves are remembered or preserved for a period of time (e.g., approximately 15 minutes). After the set time expires, the state is reset.

In some implementations, the state of the shelves are preserved until the user moves on to a different appliance or content or media category (e.g., from Movies to TV Shows).

Figure 28A:
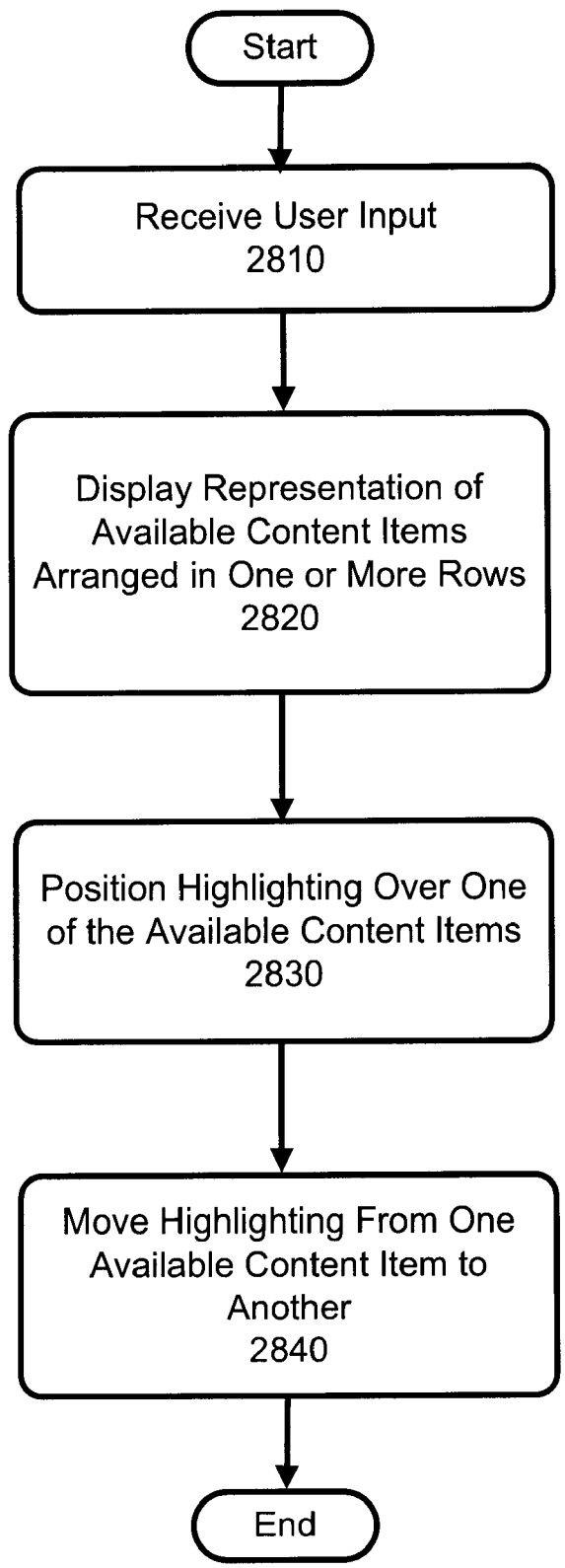

FIGS. 28A and 28B show an example process for enabling a user to navigate available content items. User input is received 2810 and a presentation of available content items arranged in one or more rows is displayed 2820. Displaying 2820 the presentation includes providing 2822 a user-selectable area to display a predetermined number of the available content items in each row, and providing 2824 a non-selectable area to display other available content items not displayed in the user-selectable area in each row. In addition, highlighting is positioned 2830 over one of the available content items. Further, based on the received user input, the highlighting is moved 2840 from one available content item to another across the one or more rows.

The one or more rows displayed can be displayed horizontally. Alternatively, the one or more rows can be displayed vertically.

Figure 29A:
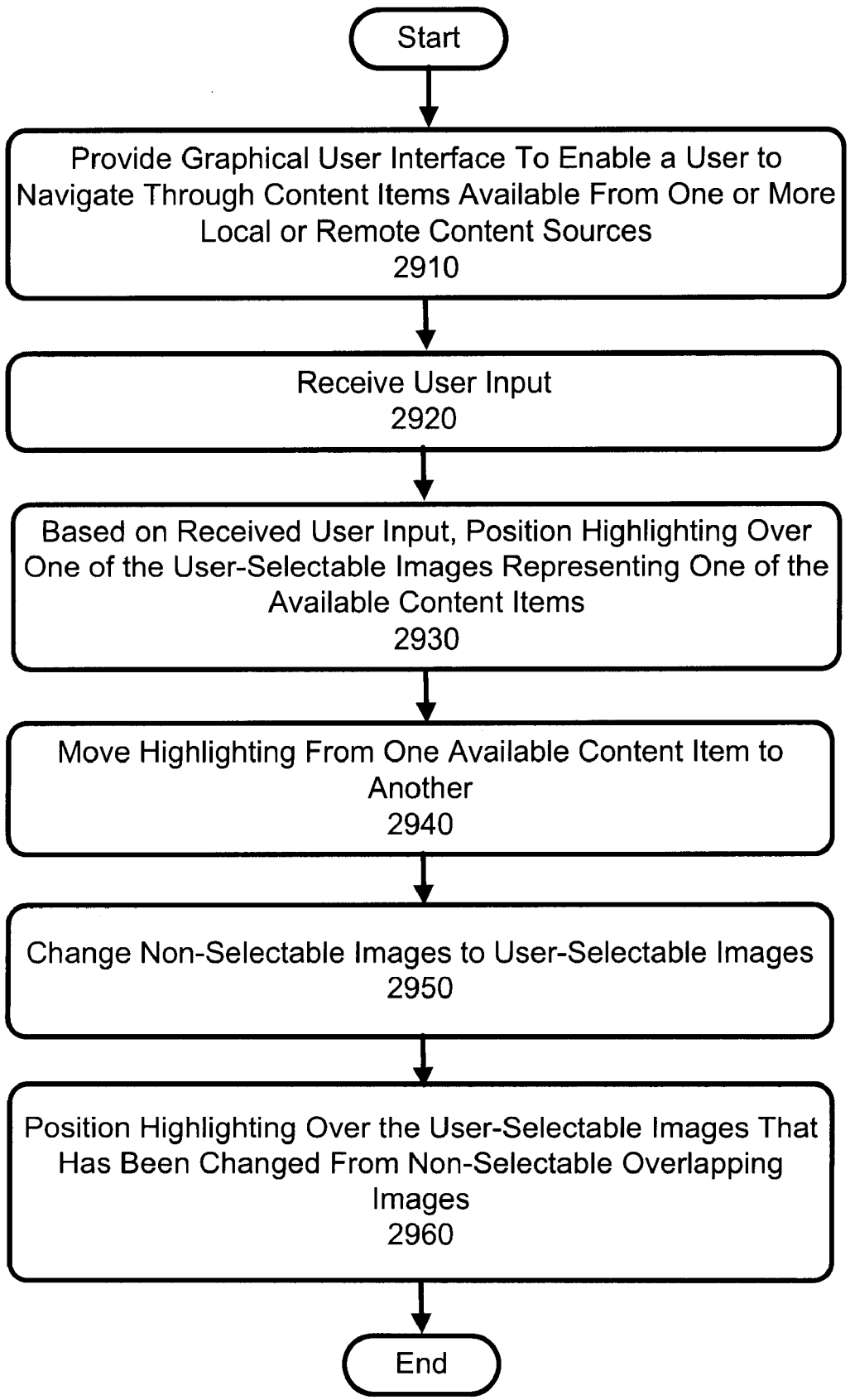
Figure 29B:
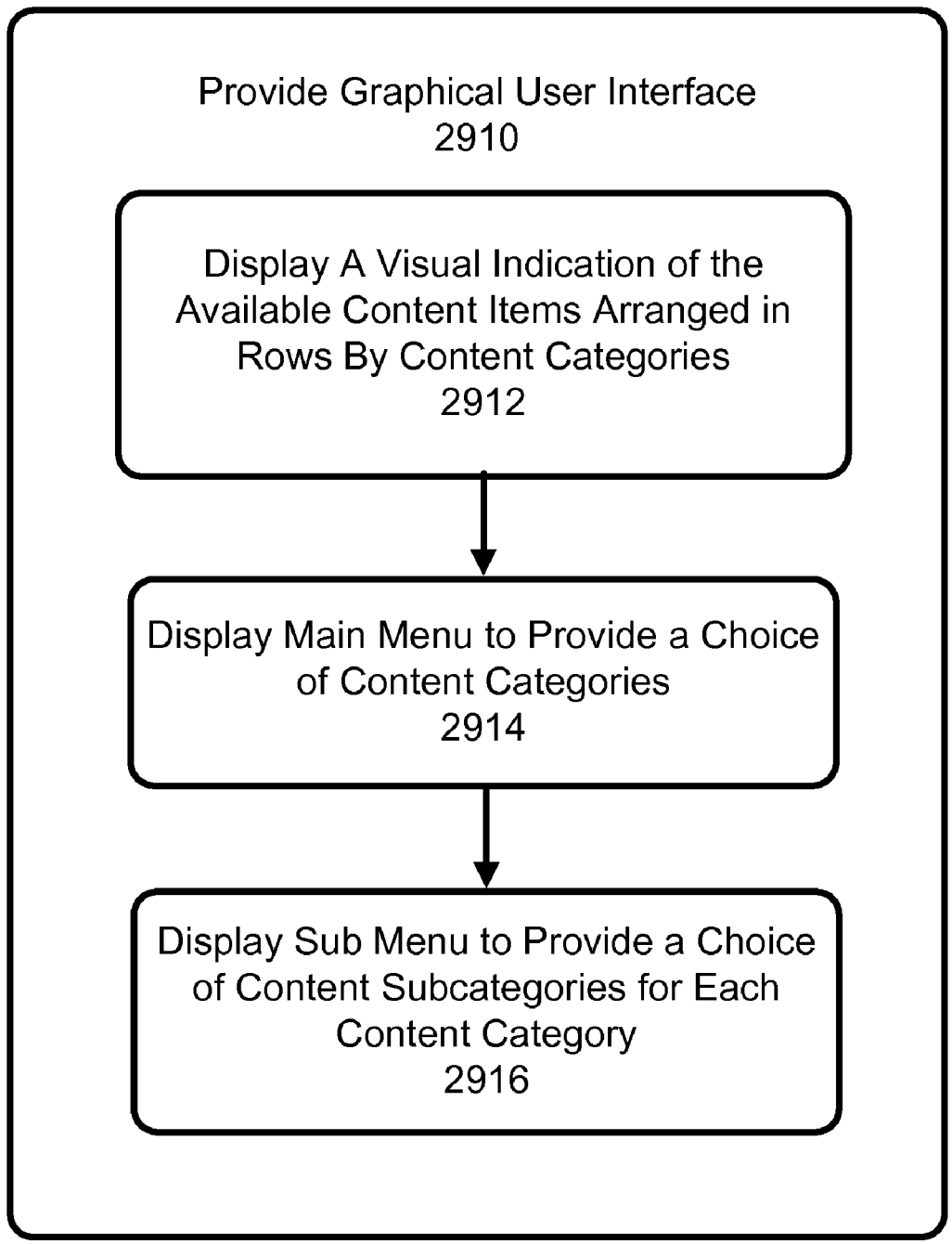

FIGS. 29A, 29B and 29C show an example process of providing a graphical user interface to a user. A graphical user interface is provided 2910 to a user to enable the user to navigate through content items available from one or more local or remote content sources. Providing 2910 the graphical user interface includes displaying 2912 a visual indication of the available content items arranged in rows by content categories. Displaying 2912 the visual indication includes displaying 2922 user-selectable images representing a predetermined number of available content items arranged in a non-overlapping manner. Also, displaying 2912 the visual indication includes displaying 2924 non-selectable images representing other available content items not represented by the user-selectable images arranged in an overlapping manner.

In addition, the example process can include receiving 2920 user input, and based on received user input, positioning 2930 highlighting over one of the user-selectable images representing one of the available content items. In addition, the highlighting can be moved 2940 across the user-selectable images based on the received user input. Also, based on the received 2920 user input, when the highlighting is moved 2940 across the rows, the non-selectable images can be changed 2950 to user-selectable images and the highlighting can be positioned 2960 over the user-selectable images that have been changed from the non-selectable overlapping images. Providing the graphical user interface can further include displaying 2914 a main menu to provide a choice of content categories, and displaying 2916 a sub menu to provide a choice of content subcategories for each content category.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A computer-implemented method, comprising:
   receiving, at a computing device, one or more content items from one or more resources, wherein content items include multimedia content, audio content, video content, image content, and user generated content;
   displaying the content items, wherein the display includes a group of content items, wherein a pre-determined amount of two or more content items in the group are initially selectable, wherein the remaining content items in the group are initially non-selectable, wherein the group of content items is capable of having multiple states within the display, wherein the multiple states include a starting state, a middle state, and an ending state, wherein a starting state initially includes a flat content item on the left and one or more tilted content items on the right, wherein a middle state includes one or more tilted content items on the left and on the right, wherein an ending state initially includes one or more tilted content items on the left and a flat content item on the right, and wherein the state of the group of content items changes when a non-selectable content item in the group is selected;
   receiving a selection corresponding to a content item in the group of content items, wherein the content item is associated with a type;
   determining whether the selected content item is a shared content item, wherein shared content items are syncable among a plurality of devices;
   associating one or more options with the selected content item, wherein the one or more options are based upon the type associated with the content item and whether the selected content item is a shared content item; and
   displaying the one or more options associated with the selected content item.

2. The method of claim 1, wherein the selection is associated with a device, wherein associating includes determining the device associated with the selection when the selected content item is a shared content item, and wherein the one or more options are also based upon the associated device when the selected content item is a shared content item.

3. The method of claim 1, wherein content items in a starting state, a middle state, and an ending state overlap as they accumulate.

4. The method of claim 1, wherein content items within the group are individually highlighted when selected.

5. The method of claim 1, wherein shared content items are selectable on a plurality of devices.

6. The method of claim 1, wherein shared content items are displayable on a plurality of devices.

7. The method of claim 1, wherein selecting a non-selectable content item in the group causes an initially selectable content item to become non-selectable and the selected non-selectable content item to becomes selectable.

8. The method of claim 1, wherein the group of content items is displayable horizontally or vertically.

9. The method of claim 1, wherein the display includes two or more groups of content items.

10. The method of claim 9, further comprising:
    navigating horizontally within a group of content items; and
    navigating vertically between two or more groups of content items.

11. The method of claim 1, wherein the state of the group of content items is saved for a pre-determined amount of time.

12. The method of claim 1, wherein the state of the group of content items is reset when a content item in a different group of content items is selected.

13. A system, comprising:
    one or more processors;
    a non-transitory computer-readable storage medium coupled to the one or more processors, and containing instructions configured to cause the one or more processors to perform operations, including:
    receiving one or more content items from one or more resources, wherein content items include multimedia content, audio content, video content, image content, and user generated content;
    displaying the content items at a display device, wherein the display includes a group of content items, wherein a pre-determined amount of two or more content items in the group are initially selectable, wherein the remaining content items in the group are initially non-selectable, wherein the group of content items is capable of having multiple states within the display, wherein the multiple states include a starting state, a middle state, and an ending state, wherein a starting state initially includes a flat content item on the left and one or more tilted content items on the right, wherein a middle state includes one or more tilted content items on the left and on the right, wherein an ending state initially includes one or more tilted content items on the left and a flat content item on the right, and wherein the state of the group of content items changes when a non-selectable content item in the group is selected;
    receiving a selection at the display device or from an input device, wherein the selection corresponds to a content item in the group of content items, wherein the content item is associated with a type;

determining whether the selected content item is a shared content item, wherein shared content items are syncable among a plurality of devices;

associating one or more options with the selected content item, wherein the one or more options are based upon the type associated with the content item and whether the selected content item is a shared content item; and displaying the one or more options associated with the selected content item.

14. The system of claim 13, wherein the selection is associated with a device, wherein associating includes determining the device associated with the selection when the selected content item is a shared content item, and wherein the one or more options are also based upon the associated device when the selected content item is a shared content item.

15. The system of claim 13, wherein content items in a starting state, a middle state, and an ending state overlap as they accumulate.

16. The system of claim 13, wherein content items within the group are individually highlighted when selected.

17. The system of claim 13, wherein shared content items are selectable on a plurality of devices.

18. The system of claim 13, wherein shared content items are displayable on a plurality of devices.

19. The system of claim 13, wherein selecting a non-selectable content item in the group causes an initially selectable content item to become non-selectable and the selected non-selectable content item to becomes selectable.

20. The system of claim 13, wherein the group of content items is displayable horizontally or vertically.

21. The system of claim 13, wherein the display includes two or more groups of content items.

22. The system of claim 21, further comprising instructions configured to cause the one or more processors to perform operations, including:

navigating horizontally within a group of content items; and navigating vertically between two or more groups of content items.

23. The system of claim 13, wherein the state of the group of content items is saved for a pre-determined amount of time.

24. The system of claim 13, wherein the state of the group of content items is reset when a content item in a different group of content items is selected.

25. A computer-program product, tangibly embodied in a non-transitory machine-readable storage medium, including instructions configured to cause a data processing apparatus to:

receive one or more content items from one or more resources, wherein content items include multimedia content, audio content, video content, image content, and user generated content;

display the content items, wherein the display includes a group of content items, wherein a pre-determined amount of two or more content items in the group are initially selectable, wherein the remaining content items in the group are initially non-selectable, wherein the group of content items is capable of having multiple states within the display, wherein the multiple states include a starting state, a middle state, and an ending state, wherein a starting state initially includes a flat content item on the left and one or more tilted content items on the right, wherein a middle state includes one or more tilted content items on the left and on the right, wherein an ending state initially includes one or more tilted content items on the left and a flat content item on the right, and wherein the state of the group of content items changes when a non-selectable content item in the group is selected;

receive a selection corresponding to a content item in the group of content items, wherein the content item is associated with a type;

determine whether the selected content item is a shared content item, wherein shared content items are syncable among a plurality of devices;

associate one or more options with the selected content item, wherein the one or more options are based upon the type associated with the content item and whether the selected content item is a shared content item; and display the one or more options associated with the selected content item.

26. The computer-program product of claim 25, wherein the selection is associated with a device, wherein associating includes determining the device associated with the selection when the selected content item is a shared content item, and wherein the one or more options are also based upon the associated device when the selected content item is a shared content item.

27. The computer-program product of claim 25, wherein content items in a starting state, a middle state, and an ending state overlap as they accumulate.

28. The computer-program product of claim 25, wherein content items within the group are individually highlighted when selected.

29. The computer-program product of claim 25, wherein shared content items are selectable on a plurality of devices.

30. The computer-program product of claim 25, wherein shared content items are displayable on a plurality of devices.

31. The computer-program product of claim 25, wherein selecting a non-selectable content item in the group causes an initially selectable content item to become non-selectable and the selected non-selectable content item to becomes selectable.

32. The computer-program product of claim 25, wherein the group of content items is displayable horizontally or vertically.

33. The computer-program product of claim 25, wherein the display includes two or more groups of content items.

34. The computer-program product of claim 33, further comprising instructions configured to cause a data processing apparatus to:

navigate horizontally within a group of content items; and navigate vertically between two or more groups of content items.

35. The computer-program product of claim 25, wherein the state of the group of content items is saved for a pre-determined amount of time.

36. The computer-program product of claim 25, wherein the state of the group of content items is reset when a content item in a different group of content items is selected.

* * * * *